US010880911B2

(12) United States Patent
Bagheri et al.

(10) Patent No.: US 10,880,911 B2
(45) Date of Patent: Dec. 29, 2020

(54) METHOD AND APPARATUS FOR SHORT PDCCH OPERATION

(71) Applicant: Motorola Mobility LLC, Chicago, IL (US)

(72) Inventors: Hossein Bagheri, Urbana, IL (US); Ravikiran Nory, Buffalo Grove, IL (US); Vijay Nangia, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/889,124

(22) Filed: Feb. 5, 2018

(65) Prior Publication Data
US 2018/0227939 A1    Aug. 9, 2018

Related U.S. Application Data

(60) Provisional application No. 62/455,564, filed on Feb. 6, 2017.

(51) Int. Cl.
*H04W 72/12* (2009.01)
*H04L 5/00* (2006.01)
*H04W 72/04* (2009.01)
*H04W 72/08* (2009.01)
*H04W 72/14* (2009.01)

(52) U.S. Cl.
CPC ....... *H04W 72/1268* (2013.01); *H04L 5/0044* (2013.01); *H04L 5/0053* (2013.01); *H04L 5/0064* (2013.01); *H04L 5/0094* (2013.01); *H04W 72/042* (2013.01); *H04W 72/0446* (2013.01); *H04W 72/085* (2013.01);

(Continued)

(58) Field of Classification Search
None
See application file for complete search history.

(56) References Cited

U.S. PATENT DOCUMENTS

| 2014/0126490 | A1* | 5/2014 | Chen | H04L 5/0048 370/329 |
|---|---|---|---|---|
| 2017/0223670 | A1* | 8/2017 | Chen | H04L 5/0053 |
| 2018/0049189 | A1* | 2/2018 | Hugl | H04W 72/042 |
| 2018/0205534 | A1* | 7/2018 | Yi | H04L 5/1469 |

(Continued)

OTHER PUBLICATIONS

Papadogiannis, PCT International Search Report, International Application No. PCT/US2018/016934, European Patent Office, Rijswijk, NL, dated Mar. 5, 2018.
Qualcomm Incorporated: "Downlink Control Channel Design for Shortened TTI" , 3GPP Draft; R1-1611638 DL Control Channel Design for Shortened TTI, 3rd Generation Partnership Project (3GPP), Mobile Competence Centre . 650, Route Des Lucio Les ; F-06921 Sophia-Antipolis Cedex; Fra , vol. RAN WG1, No. Reno, Nevada, USA; Nov. 14, 2016-Nov. 18, 2016, Nov. 5, 2016.

(Continued)

*Primary Examiner* — Andre Tacdiran
(74) *Attorney, Agent, or Firm* — Loppnow & Chapa; Matthew C. Loppnow

(57) ABSTRACT

A method and apparatus provide shortened PDCCH operation. At least one sPDCCH monitoring set including sPDCCH DL control candidates to be monitored by a device in a sTTI of the subframe can be determined. An sPDCCH belonging to one of the at least one sPDCCH monitoring set can be received. The sPDCCH can schedule DL data packet transmissions in a sPDSCH. The sPDCCH can also indicate a rate-matching indicator that indicates at least one OFDM symbol. A set of frequency resources can be determined. The sPDSCH can be decoded based on the sPDSCH being rate-matched at least around the set of frequency resources belonging to the at least one OFDM symbol indicated by the rate-matching indicator.

21 Claims, 21 Drawing Sheets

(52) U.S. Cl.
CPC .... *H04W 72/1273* (2013.01); *H04W 72/0453* (2013.01); *H04W 72/14* (2013.01)

(56) References Cited

U.S. PATENT DOCUMENTS

| | | | |
|---|---|---|---|
| 2018/0227907 A1* | 8/2018 | Hosseini | H04L 1/1896 |
| 2018/0234998 A1* | 8/2018 | You | H04W 72/1273 |
| 2018/0359745 A1* | 12/2018 | Yeo | H04L 1/18 |
| 2019/0045486 A1* | 2/2019 | Shimezawa | H04L 27/2602 |
| 2019/0045487 A1* | 2/2019 | You | H04L 5/0053 |
| 2019/0052332 A1* | 2/2019 | Shimezawa | H04B 7/0626 |
| 2019/0229879 A1* | 7/2019 | Yi | H04L 5/0082 |
| 2019/0261330 A1* | 8/2019 | Hwang | H04W 72/044 |

OTHER PUBLICATIONS

ZTE et al: "Discussion on sPDCCH for shortened TTI", 3GPP Draft; R1-164639 Discussion on SPDCCH for Shortened TTI, 3rd Generation Partnership Project (3GPP), Mobile Competence Centre; 650, Route Des Lucioles ; F-06921 Sophia-Antipolis Cedex ; France, vol. RAN WG1, No. Nanjing, China; May 23, 2016-May 27, 2016, May 14, 2016.

LG Electronics: "Discussions on sPDSCH and DMRS design", 3GPP Draft; R1-1611777 Discussions on SPDSCH and DMRS Design, 3rd Generation Partnership Project (3GPP), Mobile Competence Centre; 650, Route Des Lucioles ; F-06921 Sophia-Antipolis Cedex; France, vol. RAN WG1, No. Reno, USA; Nov. 14, 2016-Nov. 18, 2016, Nov. 13, 2016.

Qualcomm Incorporated, "Downlink Control Channel Design for Shortened TTI," R1-1611638, 3GPP TSG RAN WG1 #87, Nov. 14-18, 2016, Reno, Nevada, USA.

* cited by examiner

METHOD AND APPARATUS FOR SHORT PDCCH OPERATION

BACKGROUND

1. Field

The present disclosure is directed to a method and apparatus for short Physical Downlink Control Channel (sPDCCH) operation.

2. Introduction

Presently, wireless communication devices, such as User Equipment (UE), communicate with other communication devices using wireless signals. In current Third Generation Partnership Project Long Term Evolution (3GPP LTE), time-frequency resources for the UEs are divided into 1 ms subframes where each subframe includes two 0.5 ms slots and each slot, with normal CP duration, includes 7 Single Carrier-Frequency Division Multiple Access (SC-FDMA) symbols in the time domain in Uplink (UL) and 7 Orthogonal Frequency Division Multiplexing (OFDM) symbols in the time domain in Downlink (DL). In the frequency domain, resources within a slot are divided into Physical Resource Blocks (PRBs), where each resource block spans 12 contiguous subcarriers.

In current LTE systems, usually resources are assigned using a 1 ms minimum Transmission Time Interval (TTI) when data is available, referred to as dynamic scheduling. Within each scheduled TTI, in UL, a UE transmits data over a Physical Uplink Shared Channel (PUSCH) in PRB-pairs indicated by an UL grant that schedules the data transmission to the UE. In DL, a base station (eNB) transmits data over a Physical Downlink Shared Channel (PDSCH) in PRB-pairs indicated by a DL grant/assignment. The UL grant and/or DL assignment information is provided to the UE in a control channel, referred to as a PDCCH or Enhanced PDCCH ((E)PDCCH). The (E)PDCCH channel carries the control information about the data being transmitted by the eNB for the UE on the current subframe and the information about the resources that UE needs to use for the uplink data.

As indicated above, there are two types of downlink physical layer control signaling for the purpose of dynamic scheduling, the PDCCH and the EPDCCH. For the PDCCH, the control signaling from an eNodeB is received by user equipment (UE) in the first one, first two, first three, or first four symbols of a subframe, subsequently referred to as control symbols. The remaining symbols in the subframe, following the control symbols, are typically used for receiving user data, such as data packets instead of control signals. User data is received by the UE on the Physical Downlink Shared Channel (PDSCH), and in select Resource Blocks (RBs) of the PDSCH occupying either in the entire carrier bandwidth or a portion of it.

A UE monitors PDCCH candidates for control signaling, where monitoring implies attempting to decode. The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the Control Channel Elements (CCEs) corresponding to a PDCCH candidate of the search space $S_k^{(L)}$ are given by a formula using parameters including: total number of CCEs in the control region of subframe, derived from reduction of Physical Control Format Indicator Channel (PCFICH) and Physical Hybrid Automatic Repeat Request (HARQ) Indicator Channel (PHICH) resources; the aggregation level; the number of PDCCH candidates to monitor in the given search space; and the slot number within the radio frame.

A physical control channel is transmitted on an aggregation of one or several consecutive CCEs, where a CCE corresponds to 9 resource element groups. Each CCE is equivalent to 36 Resource Elements (REs). One CCE is the minimum PDCCH allocation unit. The number of resource-element groups not assigned to PCFICH or PHICH is $N_{REG}$. The CCEs available in the system are numbered from 0 to $N_{CCE}-1$, where $N_{CCE}=\lfloor N_{REG}/9 \rfloor$. A PDCCH consisting of n consecutive CCEs may only start on a CCE fulfilling i mod n=0, where i is the CCE number.

Another type of downlink physical layer control signaling is EPDCCH. For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set includes a set of Enhanced CCEs (ECCEs) numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission. For each serving cell, the subframes in which the UE monitors EPDCCH UE-specific search spaces are configured by higher layers. A UE shall monitor a set of (E)PDCCH candidates for control information, where monitoring implies attempting to decode each of the (E)PDCCH decoding candidates in the set according to the monitored DCI formats. The set of (E)PDCCH candidates to monitor are defined in terms of (E)PDCCH search spaces.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for sPDCCH operation. According to a possible embodiment, at least one sPDCCH monitoring set including sPDCCH DL control candidates to be monitored by the device in a sTTI of the subframe can be determined. An sPDCCH belonging to one of the at least one sPDCCH monitoring set can be received. The sPDCCH can schedule DL data packet transmissions in a sPDSCH. The sPDCCH can also indicate a rate-matching indicator that indicates at least one OFDM symbol. A set of frequency resources can be determined. The sPDSCH can be decoded based on the sPDSCH being rate-matched at least around the set of frequency resources belonging to the at least one OFDM symbol indicated by the rate-matching indicator.

According to another possible embodiment, at least one sPDCCH monitoring set including sPDCCH DL control candidates to be monitored by a device in a sTTI of a subframe can be indicated to the device. An sPDCCH belonging to one of the at least one sPDCCH monitoring set can be transmitted to the device. The sPDCCH can schedule DL data packet transmissions in a sPDSCH. The sPDCCH can also indicate a rate-matching indicator that indicates at least one OFDM symbol. An sPDSCH can be transmitted rate-matched at least around a set of frequency resources belonging to the at least one OFDM symbol indicated by the rate-matching indicator.

Figure 1:
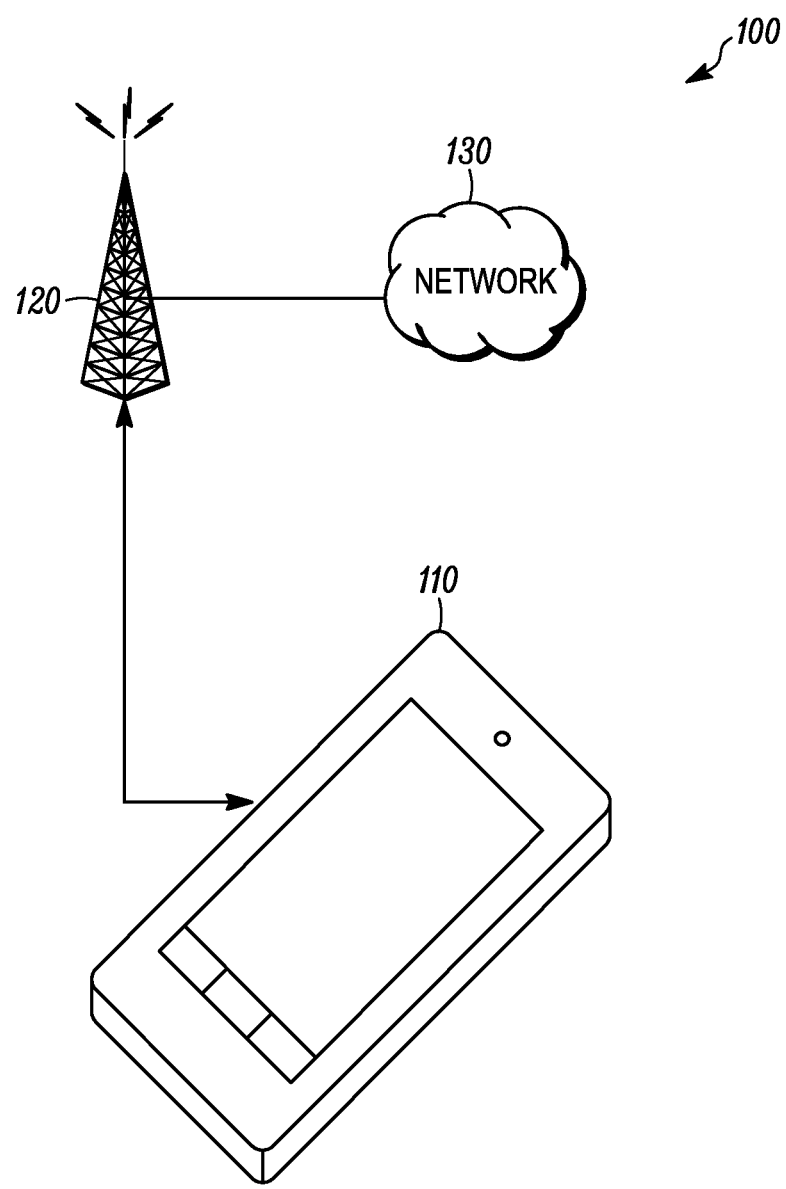
FIG. 1 is an example block diagram of a system according to a possible embodiment.

FIG. 1 is an example block diagram of a system 100 according to a possible embodiment. The system 100 can include at least one wireless communication device 110, such as User Equipment (UE), at least one base station 120, such as an enhanced NodeB (eNB) and/or an access point, and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

To reduce latency of communication in the system 100, such as an LTE system, shorter minimum TTIs (sTTIs), such as shorter than 1 ms, can be used in UL/DL. Using an sTTI allows the UE to send/receive data using reduced latency when compared to current LTE systems. In addition, acknowledging each or a group containing few sTTI(s) leading to faster acknowledging data, compared to using 1 ms TTI acknowledging data, can help in some applications such as Transmission Control Protocol (TCP) during slow-start phase for users in good channel conditions. For example, in the TCP slow-start phase for DL communication, the network-UE link capacity for a user in good channel condition can support more data, but the network sends a smaller amount of data because the network is waiting to receive the acknowledgment for the previously sent data due to the TCP slow-start phase. Therefore, faster acknowledgments, such as a result of using shorter TTI length, could help the network to better utilize the available network-UE link capacity.

For example, scheduling UE transmission over a sTTI length of 0.5 ms, such as sPUSCH scheduled using a PRB spanning a 0.5 ms in a 1 ms subframe, or scheduling UE transmission over an sTTI length of ~140 us, such as sPUSCH scheduled using a shortened PRB spanning 2 SC-FDMA symbols within a slot in a subframe, would not only reduce time taken to start and finish transmitting a data packet, but also potentially reduce the round-trip time for possible HARQ retransmissions related to that data packet.

A 'subframe' can refer to a time domain container spanning a fixed number of OFDM symbols, such as a 1 ms subframe duration for a numerology with 15 kHz subcarrier spacing. For numerology with $2^m*15$ kHz subcarrier spacing, where m can be a scaling factor with $m \in \{-2, 0, 1, \ldots, 5\}$, the subframe duration can be $\frac{1}{2^m}$ ms. A "TTI"

can typically refer to the duration in which the UE can receive/transmit a Transport Block (TB) from higher layers (i.e., a Medium Access Control (MAC) Protocol Data Unit (PDU) from a MAC layer). Therefore, TTI length can depend on how TBs are mapped to REs, and OFDM symbols. The TTI may include resources for a control channel, which may be used for resource assignment within the TTI to the UE. The physical layer can offer information transfer services to MAC and higher layers transport channels such as Downlink Shared Channel (DL-SCH) and Uplink Shared Channel (UL-SCH), which can be characterized by support for HARQ, dynamic link adaptation by varying the modulation, coding and transmit power, dynamic and semi-static resource allocation, possibility to use beamforming, etc. The DL-SCH and UL-SCH transport channels of subframe length TTI can be mapped to physical channels PDSCH and PUSCH with associated control channels such as PDCCH and PUCCH. The PDCCH can inform the UE about at least the resource allocation/assignment and Hybrid ARQ information of subframe length TTI DL-SCH, and uplink scheduling grant and Hybrid ARQ information for subframe length TTI UL-SCH. The PUCCH can carry Hybrid ARQ ACK/NAKs in response to subframe length TTI downlink transmission, and can carry Scheduling Request (SR), and CSI reports. Over the physical layer, the subframe length TTI DL and UL transmissions can use subframes with a plurality of OFDM/SC-FDMA symbols (e.g., 14 symbols at 15 kHz subcarrier spacing numerology with 1 ms subframe duration). The PDCCH channel can carry the control information about the data being transmitted on the current subframe and the information about the resources that a UE needs to use for the uplink data. That means it can be mandatory for the UE to decode it successfully if the UE wants to send some data or receive something.

Short TTI (sTTI) can provide support for TTI length shorter than subframe length DL-SCH and UL-SCH. The short TTI DL-SCH and UL-SCH transport channels can be mapped to physical channels short PDSCH (sPDSCH) and short PUSCH (sPUSCH) with associated control channels short PDCCH (sPDCCH) and short PUCCH (sPUCCH). The sPDCCH can inform the UE about at least the resource allocation/assignment and Hybrid ARQ information of 1 ms TTI DL-SCH, and uplink scheduling grant and Hybrid ARQ information related to short TTI (TTI length shorter than subframe length) DL-SCH and uplink scheduling grant and Hybrid ARQ information related to short TTI (TTI length shorter than subframe length) UL-SCH. The sPUCCH can carry Hybrid ARQ ACK/NAKs in response to short TTI downlink transmission, and can carry Scheduling Request (SR), and possibly CSI reports. The sPDCCH and sPUCCH may be transmitted with duration shorter than subframe length.

Over the physical layer, the short TTI DL and UL transmissions can use slots or subslots which can be a portion of a subframe with a number of OFDM/SC-FDMA symbols (e.g., 7 symbols slot, 2 or 3 symbols subslot with 15 kHz subcarrier spacing numerology) smaller than the number of symbols of the subframe (e.g., 14 symbols). For reduced latency, a shortened PDCCH (sPDCCH) can be defined to play a similar role in a sTTI or a group of sTTIs. For a PDCCH, allocation of resources can happen in terms of CCE, which is equivalent to 36 REs. One CCE is the minimum PDCCH allocation unit. For sPDCCH, sPDCCH can be formed by aggregation of one or more short control channel elements (sCCEs), with each sCCE can include a set of resource elements, such as 48 REs or 72 REs. One sCCE can be the minimum sPDCCH allocation unit.

For example, a CCE can include 9 Resource Element Groups (REGs), and each REG can include 4 consecutive REs of an RB excluding REs belonging to Cell Specific Reference Signals (CRSs). The REGs forming a CCE can be distributed across the PDCCH control region (i.e., PDCCH symbols in time and system BW in frequency) through an interleaving formula. A sCCE can include less REGs than the 9 REGs of a legacy CCE. In particular, a sCCE can include 6 sREGs for DMRS-based sPDCCH in a 3-symbol sTTI and 4 sREGs otherwise (i.e., for CRS-based sPDCCH in 2 or 4-symbol sTTI and for DMRS-based sPDCCH in a 2-symbol sTTI). Each sREG can include 1 RB within 1 OFDM symbol including REs for CRS and/or DMRS, where the reference symbol for decoding a DMRS-based sPDCCH is DMRS reference signal; the reference symbol for decoding a CRS-based sPDCCH is CRS reference signal; and the sREGs are distributed in sPDCCH symbols in time and in sPDCCH RB-set in frequency according to another interleaving formula.

As the sTTI length becomes smaller, the control overhead can increase, which in turn can increase the complexity and hence the processing delay, which could negatively impact the latency reduction offered by low-latency operation. To reduce the control signal overhead, few general approaches are possible.

According to a first approach, multiple sTTIs can be scheduled via a single grant that can be sent via an sPDCCH or (E)PDCCH command that can be referred to as multi-sTTI scheduling. According to a second approach, control information can be sent in a hierarchical manner, such as in more than one step. For instance, a first step, referred also to as "slow-DCI," can provide a subset of control information common to a set of sTTIs at a first time instant, and a second step, referred also to as "fast-DCI," can provide complementary control information pertinent to each sTTI at a second time instant. The first step can contain resource/search space information of the second step control information. According to a third approach, the control information can be sent in each scheduled sTTI, but with some DCI bit field reduction compared to the DCIs used for a legacy 1 ms-TTI. For instance, for 2-symbol sTTI, the RBG size can be larger, such as 6 times larger, than that of used for legacy 1 ms-TTI.

Figure 2:
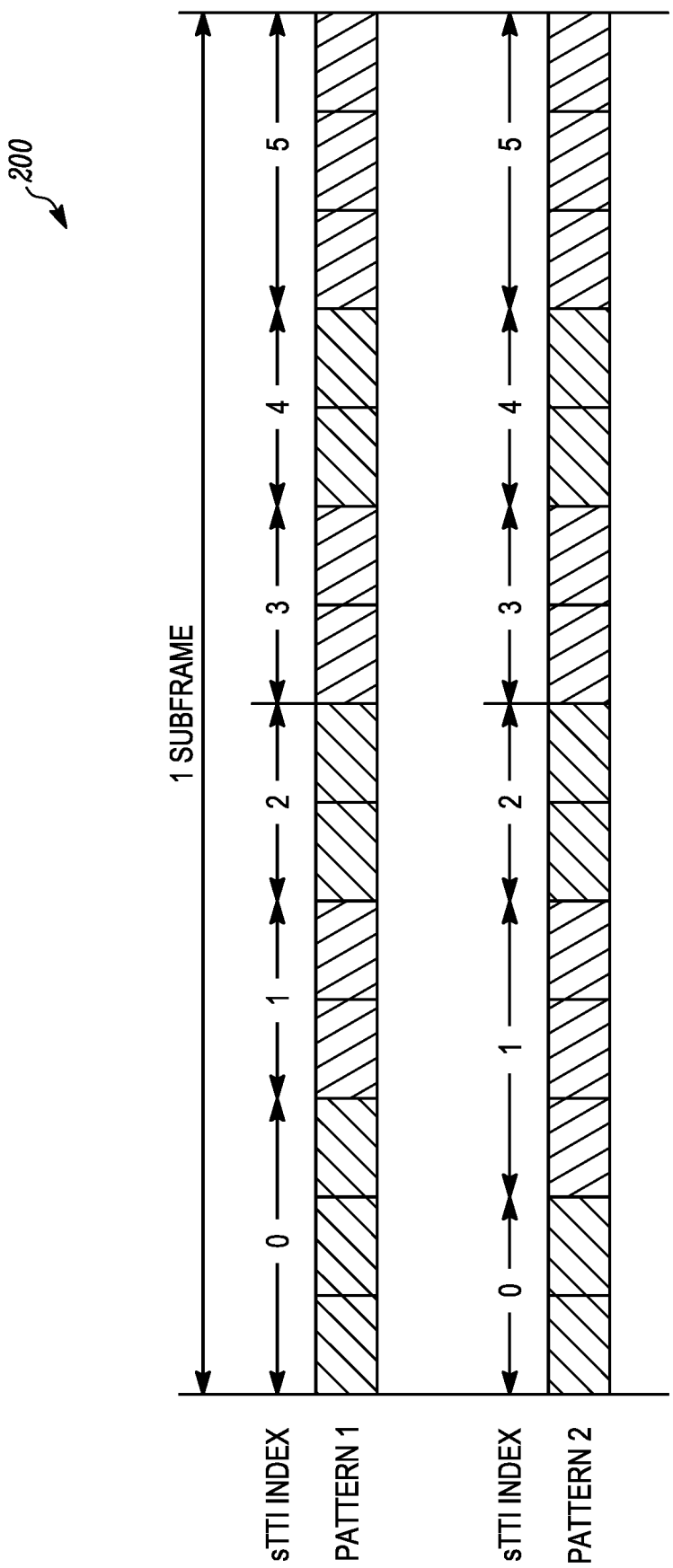
FIG. 2 is an example illustration of sTTI patterns in OFDM symbols per subframe that are supported for 2-symbol TTI according to a possible embodiment.

FIG. 2 is an example illustration 200 of sTTI patterns in OFDM symbols per subframe that are supported for 2-symbol TTI according to a possible embodiment. The UE can determine which DL sTTI pattern to use based on a Control Format Indicator (CFI) value indicated by PCFICH, such as based on the PDCCH length in number of OFDM symbols, for the case of a self-carrier scheduled component carrier, and via Radio Resource Control (RRC) signaling for the case of cross-carrier scheduled component carrier. CRS-based and Demodulation Reference Signal (DMRS)-based sPDCCHs can be supported.

Figure 3:
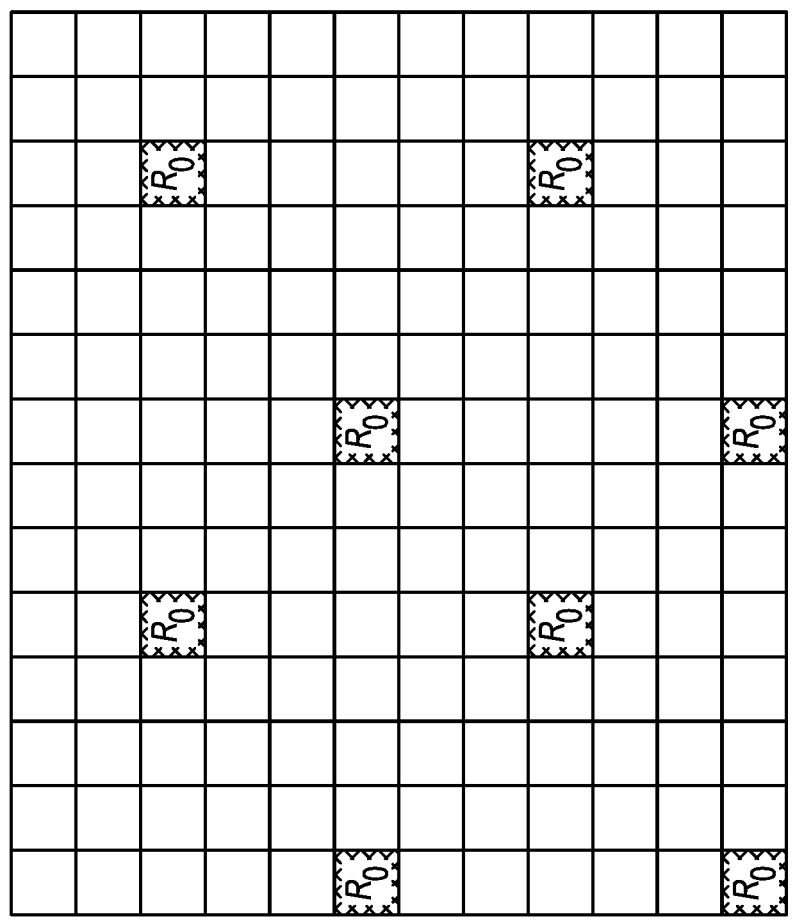
FIG. 3 is an example illustration of CRS symbols in a subframe for one antenna port according to a possible embodiment.
Figure 4:
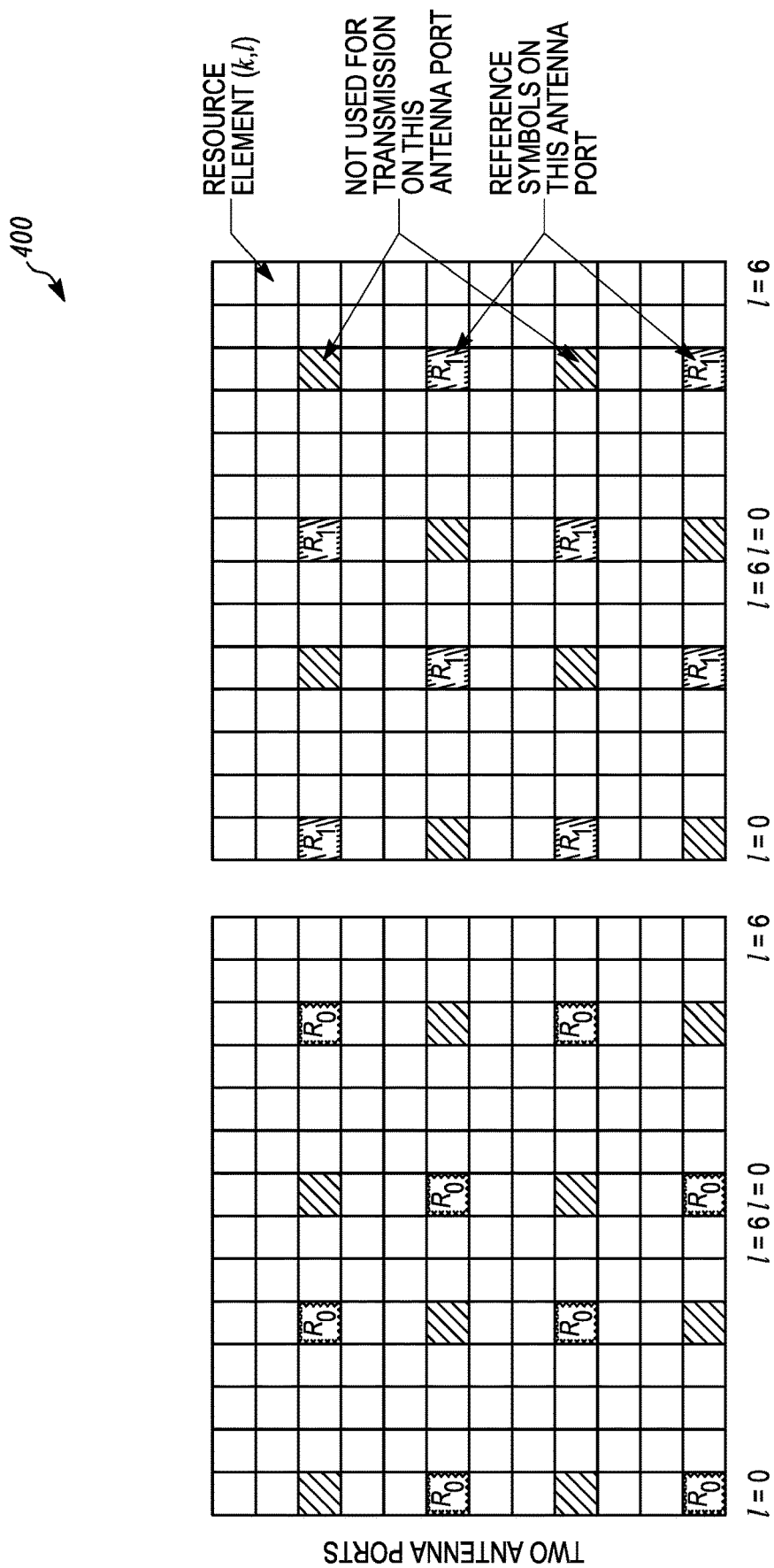
FIG. 4 is an example illustration of CRS symbols for two antenna ports according to a possible embodiment.
Figure 5A:
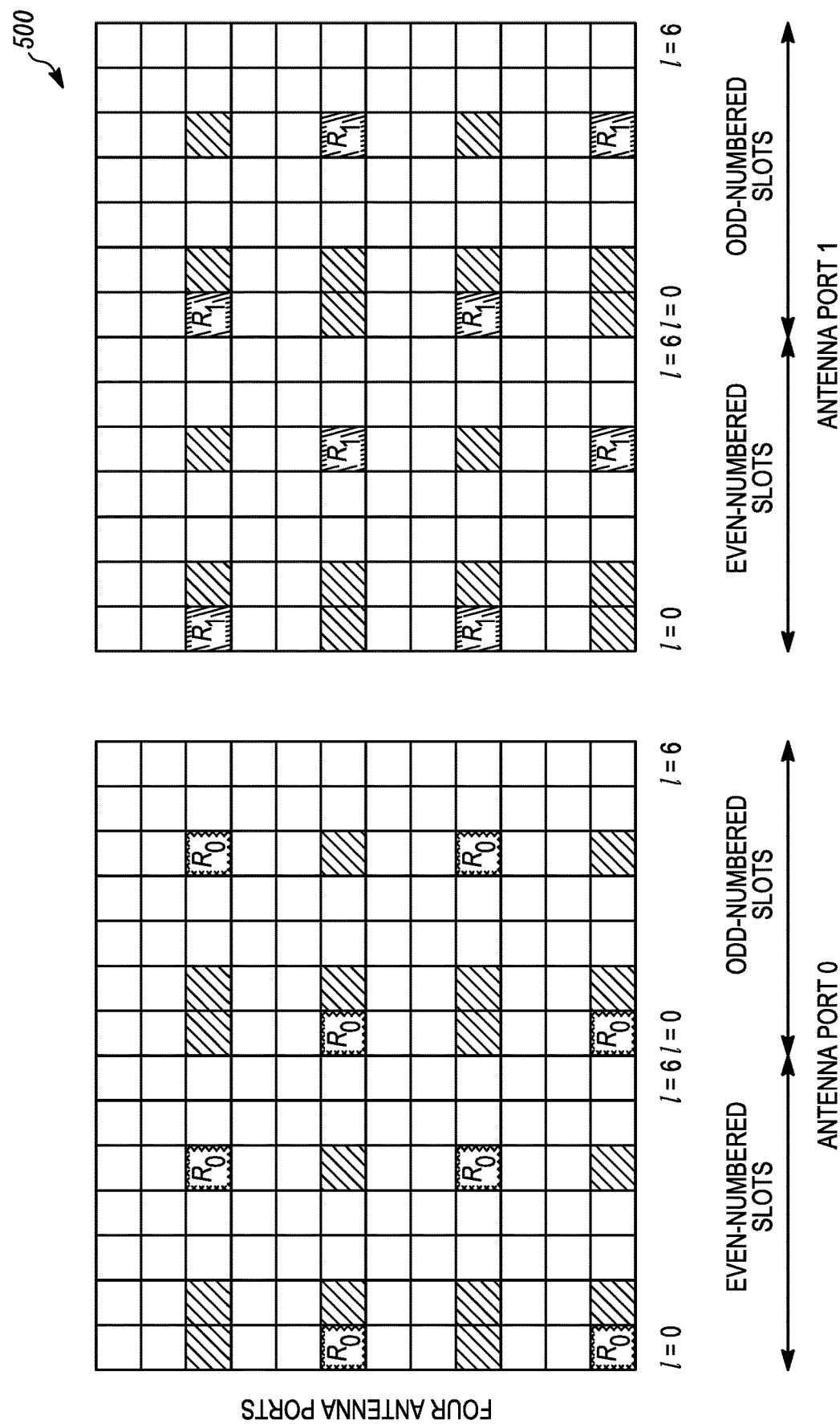
FIGS. 5A and 5B is an example illustration of CRS symbols for four antenna ports according to a possible embodiment.
Figure 5B:
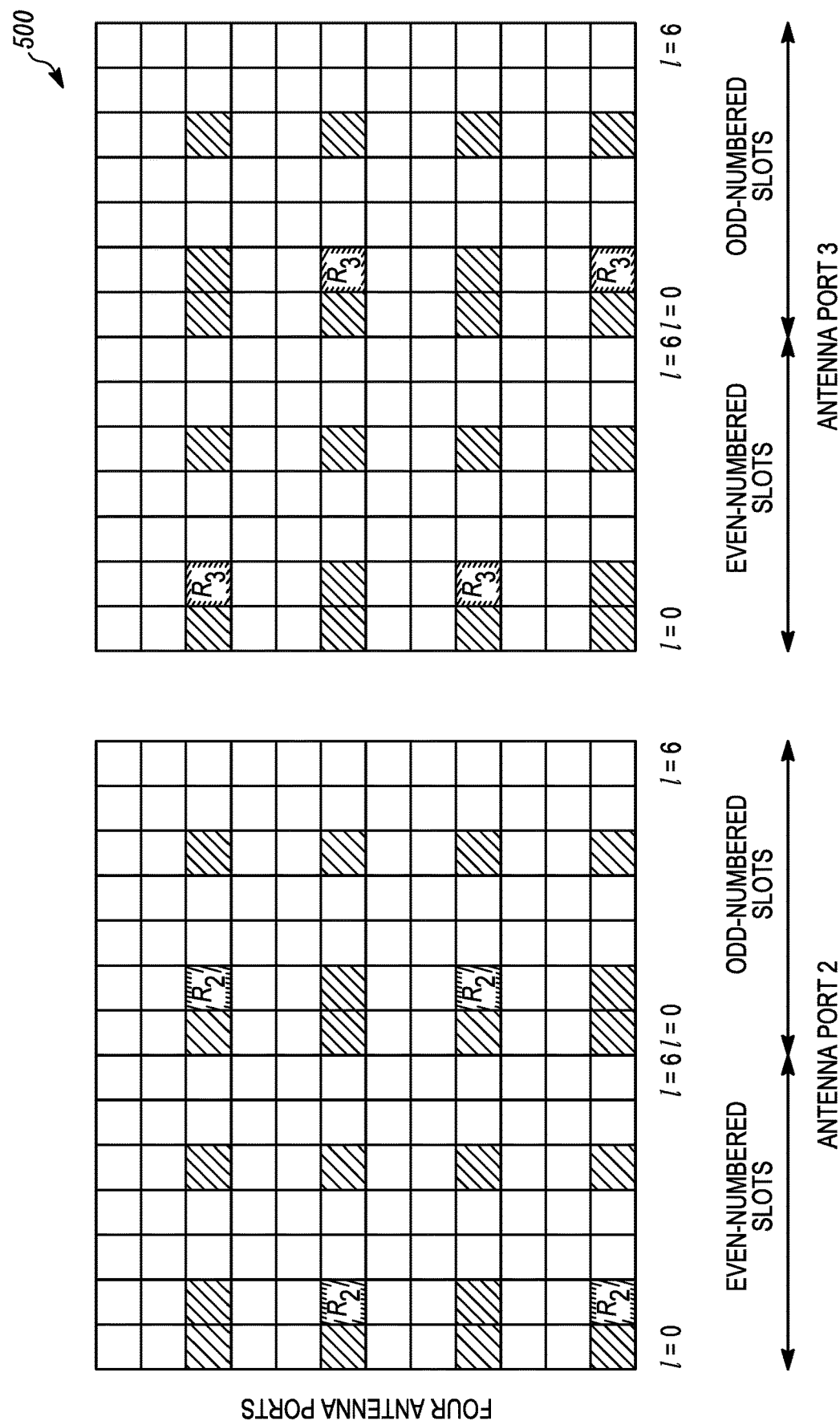

FIG. 3 is an example illustration 300 of CRS symbols R0 in a subframe for one antenna port according to a possible embodiment. FIG. 4 is an example illustration 400 of CRS symbols R0 and R1 for two antenna ports according to a possible embodiment. FIGS. 5A and 5B is an example illustration 500 of CRS symbols R0, R1, R2, and R3 for four antenna ports according to a possible embodiment. For CRS-based sPDCCH, frequency diversity can be important, so it can be good to spread the sPDCCH resources in frequency instead of time. To achieve better latency reduction, sPDCCH can be sent in the first symbol of an sTTI, so that it can be processed faster. The CRS symbols can be located in specific OFDM symbols in a subframe. For instance, for 2 antenna port CRS in illustration 400, symbols 0, 4, 7, and 11 contain CRS, and for 4 antenna port CRS in illustration 500, symbols 0, 1, 4, 7, 8, and 11 contain CRS.

Thus, for CRS-based sPDCCH, depending on where CRS symbol is with respect to an sTTI, the number of sPDCCH containing symbols can change. For example, considering two CRS antenna ports; for DL sTTI pattern 1, for sTTI index 1, a CRS symbol can be located at the end of the sTTI, and the previous CRS can be located at the first symbol of the sTTI 0, such as 3 symbols before the beginning of the sTTI index 1. Hence, to take advantage of the CRS in the second symbol, such as OFDM symbol 4, of the sTTI index 1, it may be useful to have sPDCCH occupying two symbols instead of one symbol in that sTTI.

According to a possible embodiment, the number of symbols in an sTTI containing sPDCCH for a UE can be determined based on the DL sTTI pattern and the sTTI index inside a subframe. This embodiment can be useful if a UE has not been scheduled in the previous subframes. In such a case, the CRS filtering performance to estimate the channel quality may not be quite accurate, as not many CRS containing symbols, except possibly the first CRS in a subframe for PDCCH monitoring, are available for the filtering. For instance, if the temporal variation of the channel is noticeable, having a recent CRS containing symbol may significantly enhance the channel estimation quality. For instance, the following is an example of number of sPDCCH symbols for a UE:

TABLE 1 number of OFDM symbols for sPDCCH based on DL sTTI pattern and sTTI index for a 2-antenna port CRS configuration

| | sTTI index | | | | | |
|---|---|---|---|---|---|---|
| | 0 | 1 | 2 | 3 | 4 | 5 |
| sTTI pattern 1 (number of OFDM symbols for sPDCCH) | 1 | 2 | 1 | 1 | x | 1 |
| sTTI pattern 2 (number of OFDM symbols for sPDCCH) | 1 | y | 1 | 1 | x | 1 |

TABLE 2 number of OFDM symbols for sPDCCH based on DL sTTI pattern and sTTI index for a 4-antenna port CRS configuration

| | sTTI index | | | | | |
|---|---|---|---|---|---|---|
| | 0 | 1 | 2 | 3 | 4 | 5 |
| sTTI pattern 1 (number of OFDM symbols for sPDCCH) | 2 | 2 | 1 | 2 | x | 1 |
| sTTI pattern 2 (number of OFDM symbols for sPDCCH) | 2 | y | 1 | 2 | x | 1 |

In the above tables, the values "x" and "y" can be fixed in the specifications, such as x=1, y=1; configured via higher layer signaling, such as via RRC or Medium Access Control-Control Element (MAC-CE) signaling, or indicated via physical layer signaling, such as via a slow-DCI at the beginning of a subframe. Although, a physical layer indication may or may not be efficient compared to the other above-mentioned schemes because, in case of miss detection of the slow-DCI, the fast-DCI may not be decodable.

One possible example option can be also to indicate via higher layer signaling, such a RRC or MAC-CE, or via physical layer signaling, such as slow-DCI, (although higher-layer signaling may be preferred) whether the sPDCCH occupies: 1 symbol for all sTTIs of a subframe; 2 symbols for all sTTIs of a subframe; or 1 symbol for some sTTIs and 2 symbols for other sTTIs of a subframe. For example, for 2-CRS antenna port configuration, for DL sTTI pattern 1, all sTTIs of a subframe can have CRS-based sPDCCH occupying 1 symbol, except the sTTI index 1 where the sPDCCH can occupy 2 symbols.

In the time domain, sPDCCH candidates can occupy 1 or 2 symbols in all sTTIs of a subframe, where 2 sTTIs can allow up to 3 symbols. It may be possible to have CRS-based sPDCCH occupy only the first symbol of an sTTI, such as to potentially enhance latency and frequency diversity. However, having 2 OFDM symbols for both DMRS-based and CRS-based sPDCCHs can simplify the design, and can allow simultaneous scheduling using multiple high aggregation levels easier. For example, in an sTTI containing 2 CRS ports at the first symbol of sTTI, two UL grants with Aggregation Level (AL)=8 may require ~72 RBs if sPDCCHs span only one symbol whereas only ~30 RBs may be needed if sPDCCHs span two symbols. The frequency diversity gain of using one symbol vs. two symbols for sPDCCH candidates with AL=2 or higher in an sTTI may become small. Besides, based on the position of CRS symbols with respect to an sTTI, early sPDCCH decoding benefit may not be always achievable.

Based on the DL sTTI pattern 1, and assuming 2 CRS antenna ports, consider sPDCCH for sTTI index 1 shown in the illustration 200. The early decoding benefit of having sPDCCH span only the first symbol of the sTTI may not be achievable, because of poor sPDCCH decoding performance. For instance, if the UE has not been scheduled in the previous subframes, such as due to Discontinuous Reception (DRX), the CRS filtering performance to estimate the channel quality may not be quite accurate as the only already available CRS symbol can be located at the first symbol of the sTTI 0, such as 3 symbols before the beginning of the sTTI index 1. In such a scenario, including the CRS in the second symbol of the sTTI index 1, such as OFDM symbol 4, for sPDCCH demodulation may be useful. Then, the benefits of using one symbol over two symbols for sPDCCH may be clarified, such as how much frequency diversity gain outweighs the benefits of using two symbols for sPDCCH. Similarly, for sTTI 0 in both DL sTTI patterns, if sPDCCH uses 4 CRS antenna ports for transmit diversity, then having sPDCCH span two symbols may be beneficial.

Figure 6:
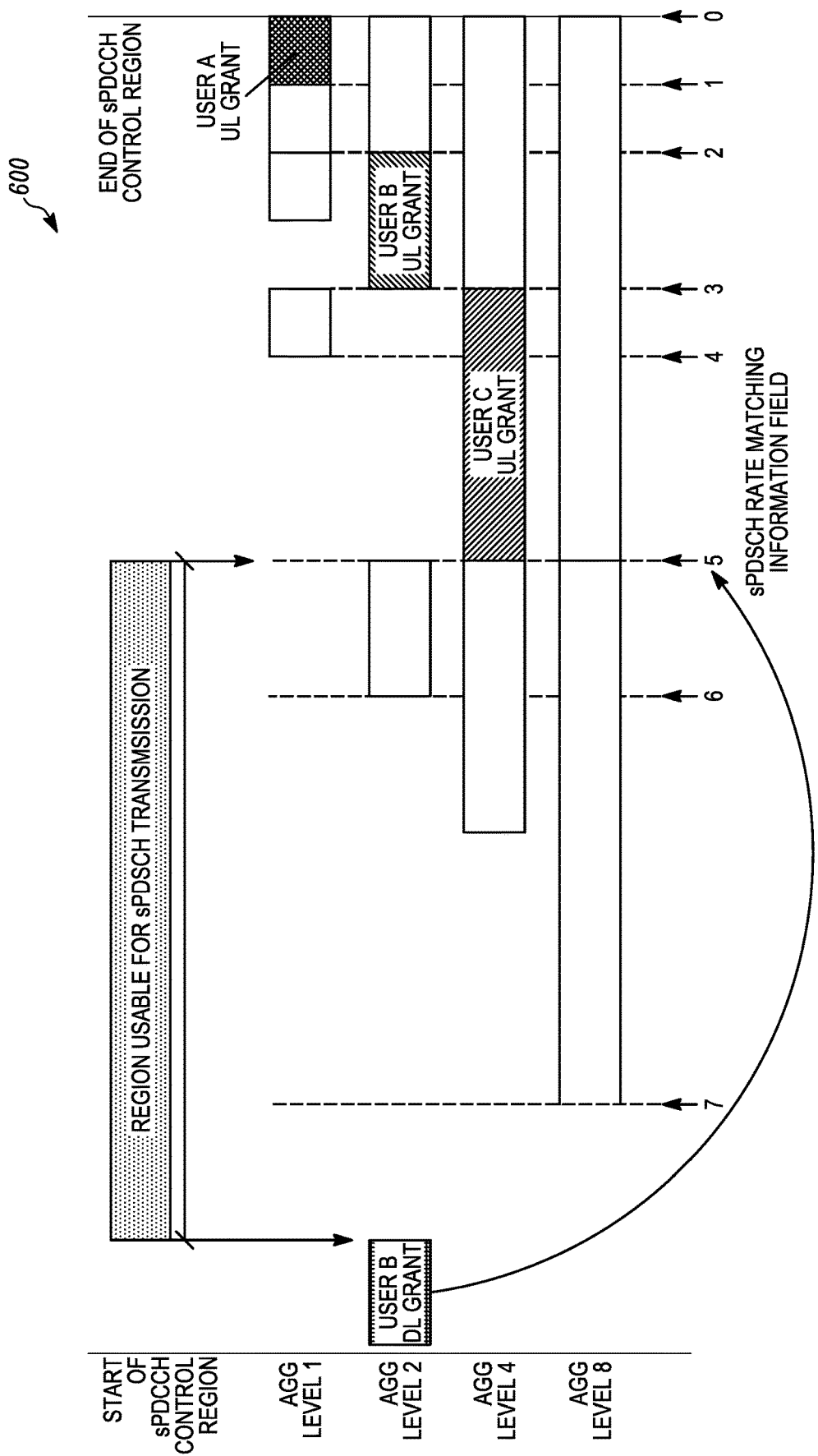
FIG. 6 is an example illustration of indicating unused control resources for sPDSCH transmission according to a possible embodiment.

FIG. 6 is an example illustration 600 of indicating unused control resources for sPDSCH transmission according to a possible embodiment, where frequency is along the x-axis. A sPDSCH Rate Matching Information field within the DL Stage 1 grant can be sized to 3 bits to provide 8 locations within the sPDCCH region to identify the start of the UL grants within the control region. In the illustration 600, an example of the 8 locations within the sPDCCH control region are shown which map to the start of UL control grants corresponding to the different aggregation levels. For this example, 3 UL grants can be allocated for three separate users, with the first grant placement for User C. In User B's DL grant, the sPDSCH Rate Matching Information field can be populated with the value of 5 which can inform user B that the portion of the control region starting at the end User B's DL grant to the start of the placement marker "5" within the control region will be used for sPDSCH data transmission.

In an sTTI, an eNB may not use all the sPDCCH candidates to schedule sTTI transmissions. In such a case, the unused control resources can be utilized to send DL data, such as on the sPDSCH. For instance, an eNB may quantize the control region and indicate to a sTTI UE in an sTTI how much of the control resources are available/unavailable for its DL sTTI transmission. The illustration 600 shows an example where the UE B gets its DL grant in an sTTI and, based on an indication in the DL grant, it can know which part of the sPDCCH control region is free for which the eNB can schedule the UE B for sPDSCH. As an example, eNB can indicate to the UE that its DL sPDSCH is scheduled in the whole available bandwidth in an sTTI containing 2 OFDM symbols. However, since some REs can be allocated to grants, such as UL grants, for other UEs, the eNB can indicate index 5 in the illustration 600 which can mean the rest of the control resources can be used after the grant for UE C.

According to another possible embodiment, unused control resources of another TTI length can be indicated to a sTTI UE. Assuming in a cell, there are 1 ms-TTI UEs, 0.5 ms-sTTI UEs, and 2-symbol (2OS)-based sTTI UEs, one question is, for example, for DL sTTI pattern 1 shown in the illustration 200, how can a UE B configured for 2OS-based DL sTTI transmission be indicated unused control resources configured/assigned for PDCCH candidates in sTTI index 0 and sPDCCH candidates for 0.5 ms-sTTI UEs in sTTI index 3 and possibly in sTTI index 4, to use for its sPDSCH transmission?

According to a possible embodiment, for PDCCH candidates in sTTI 0, the UE B can know the PDCCH control region length, such as via a Control Format Indicator (CFI) value so, similar to the scheme in illustration 600, an eNB can quantize the PDCCH region and indicate which resources are available for sPDSCH transmission to the UE. Different from the illustration 600, the quantization of the PDCCH region can be different, such as not based on the PDCCH CCEs, but for instance, based on the fraction of the bandwidth. For example, an eNB can indicate a fraction from a set of {1, ½, ¼, ⅛} fractions available for sPDSCH from the beginning of the frequency region or alternatively can indicate for instance, whether the first half, the last half, the first ½, the second ¼, etc. is available. Note that since, UE B knows the length of the PDCCH region in number of OFDM symbols, which might be different than the length of sPDCCHs for 2OS, it can understand what REs are available.

According to another possible embodiment, assume for sTTI 3, UE B knows that its sPDCCH occupies only OFDM symbol index 7. If there is a UE D configured for 0.5 ms-sTTI DL sTTI operation, and if its sPDCCH resources overlap in frequency with sPDSCH allocation of UE B with possibly different number of OFDM symbols, such as sPDCCH for 0.5 ms-sTTI UE D takes 2 OFDM symbol, i.e., OFDM symbol index 7 and 8 in a subframe, for the sake of unused sPDCCH indication to UE B, the eNB can also indicate the length of the 0.5 ms-sPDCCH(s) in symbols to UE B. This way, UE B can know if REs in both symbols are available for reuse for sPDSCH or just the REs in the second symbol are available.

For instance, in the illustration 600, if the eNB indicates index 5 to UE B when there was no 0.5 ms-sPDCCH and all 2OS sPDCCHs were taking only symbol index 7, UE B would know that in symbol 7, a fraction of the bandwidth available for sPDSCH and in symbol 8, all the bandwidth is available based on index 5. For the case of having 0.5 ms-sPDCCH taking 2 OFDM symbols, indicating index 5 to UE B can mean only a fraction of resources are available in both symbols 7 and 8. As an option, there can be a field in the UE B's DL grant indicating the number/index of OFDM symbols that the rate-matching frequency index, such as the frequency availability index as shown in the illustration 600, refers to.

Figure 7:
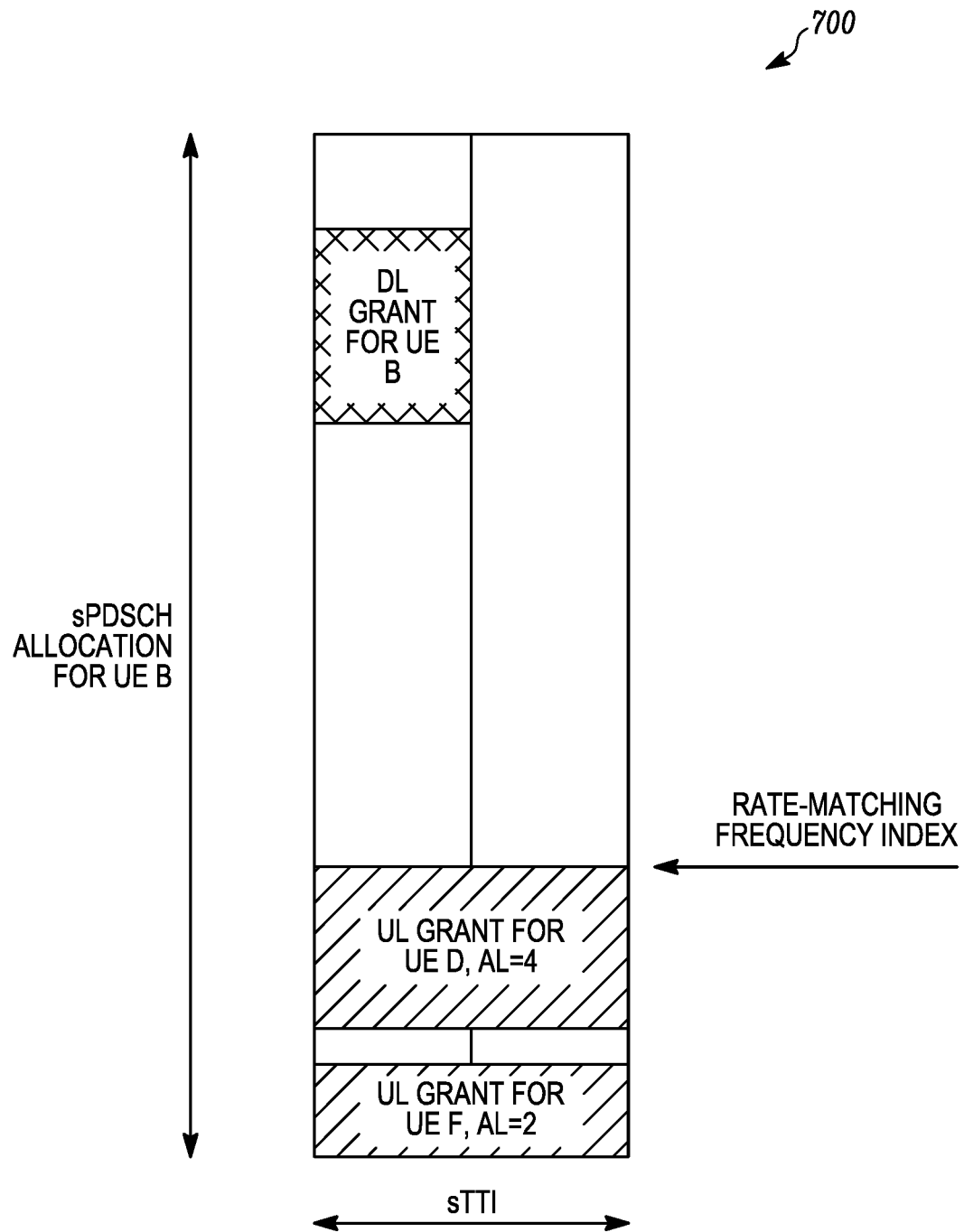
FIG. 7 is an example illustration in which a 2OS-based sTTI UE can be allocated the whole bandwidth for sPDSCH and there are two UL grants for two 0.5-ms-sTTI UEs according to a possible embodiment.

FIG. 7 is an example illustration 700 in which a 2OS-based sTTI UE B can be allocated the whole bandwidth for sPDSCH, and there are two UL grants for two 0.5-ms-sTTI UEs, such as UE D and UE F, according to a possible embodiment. UE B can also be indicated the rate-matching time index=2 OFDM symbols.

Figure 8:
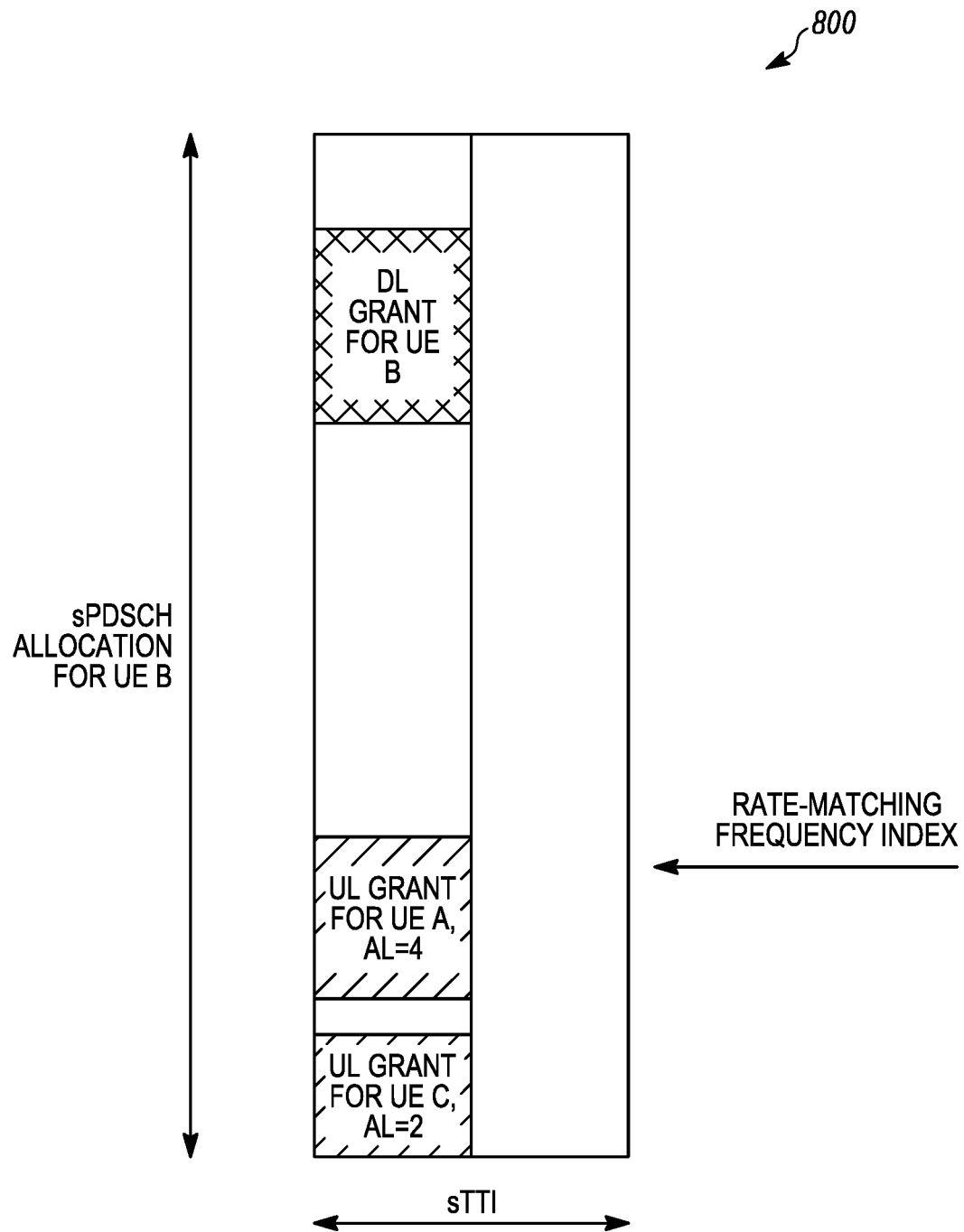
FIG. 8 is an example illustration in which a 2OS-based sTTI UE can be allocated the whole bandwidth for sPDSCH and there can be two UL grants for two 2OS-sTTI UEs according to a possible embodiment.

FIG. 8 is an example illustration 800 in which 2OS-based sTTI UE B can be allocated the whole bandwidth for sPDSCH, and there can be two UL grants for two 2OS-sTTI UEs, such as UE A and UE C, according to a possible embodiment. UE B can also be indicated the rate-matching time index=1 OFDM symbol.

Figure 9:
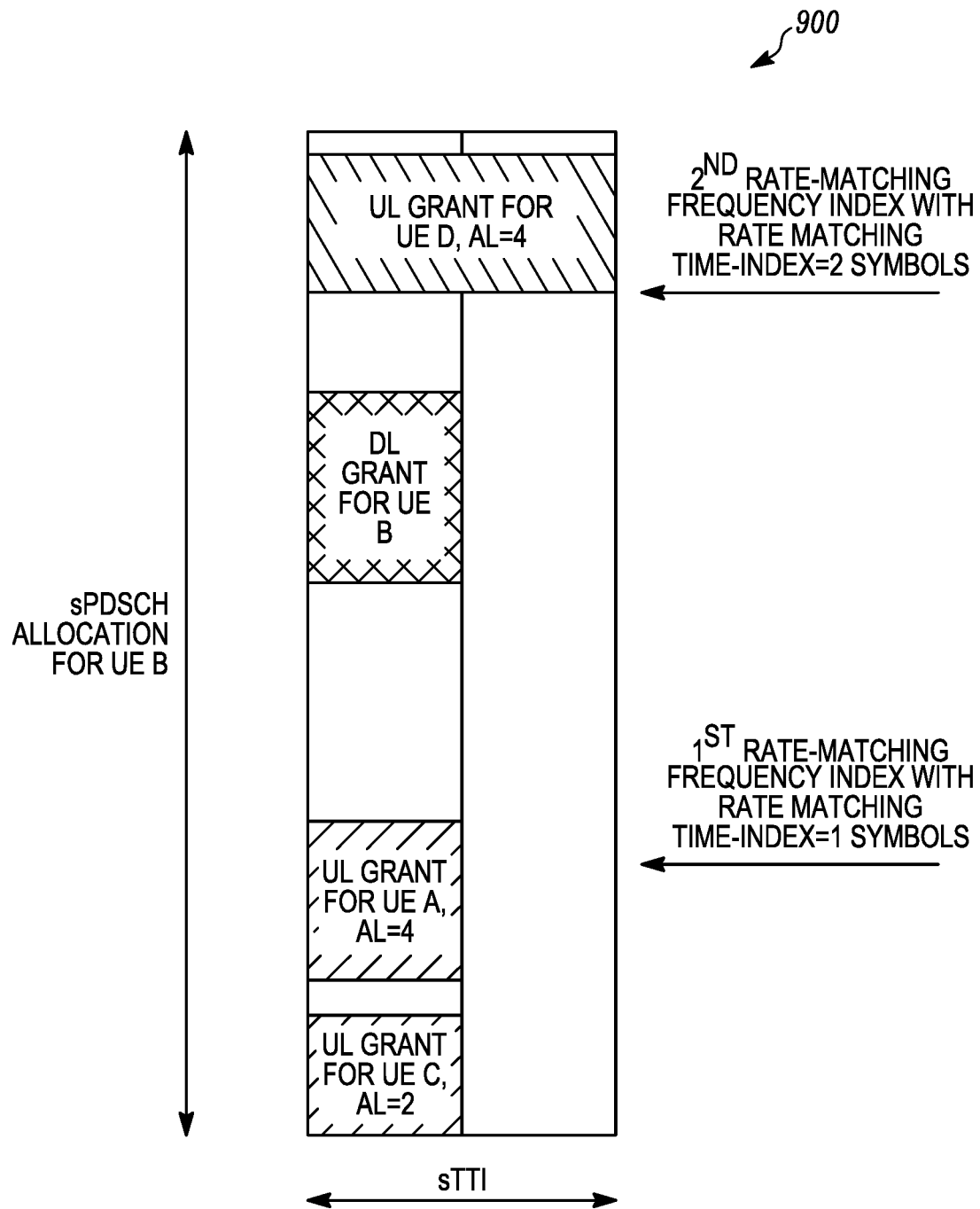
FIG. 9 is an example illustration in which a 2OS-based sTTI UE can be allocated the whole bandwidth for sPDSCH and there are two UL grants for two 2OS-sTTI UEs and 1 UL grant for a 0.5 ms-sTTI UE according to a possible embodiment.

FIG. 9 is an example illustration 900 in which a 2OS-based sTTI UE B can be allocated the whole bandwidth for sPDSCH, and there are two UL grants for two 2OS-sTTI UEs, such as UE A and UE C, and 1 UL grant for 0.5 ms-sTTI UE D according to a possible embodiment. UE B can also be indicated the rate-matching time index=1 OFDM symbols for 2OS-sTTI UE grants and rate-matching time index=2 OFDM symbols for 0.5 ms-sTTI UE grants. According to a possible implementation, at the cost of additional bits in UE B's DL grant, an eNB can indicate a more detailed rate-matching information as shown in the illustration 900.

Figure 10:
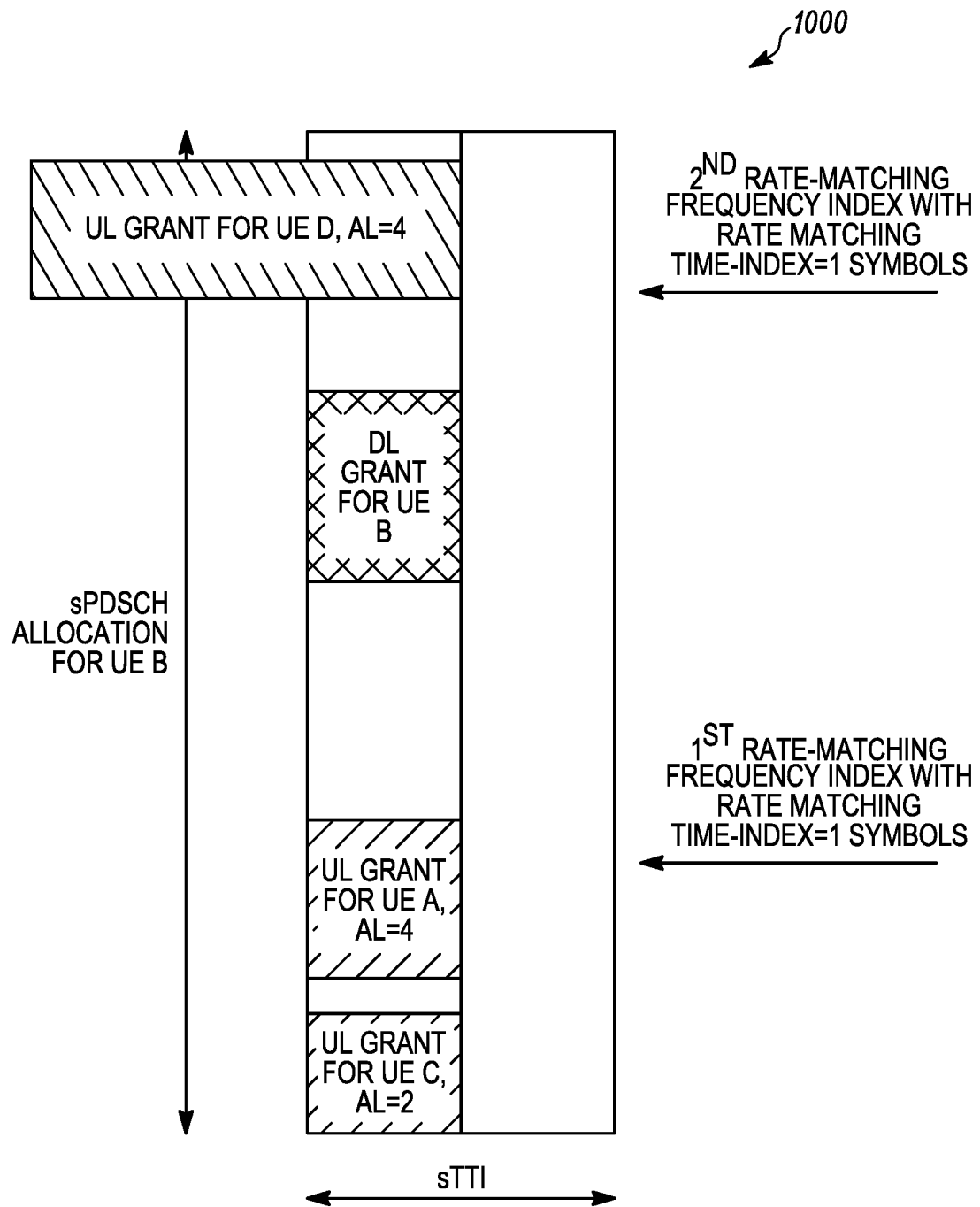
FIG. 10 is an example illustration in which a 2OS-based sTTI UE can be allocated the whole bandwidth for sPDSCH and there are two UL grants for two 2OS-sTTI UEs and one UL grant for a 0.5 ms-sTTI UE according to a possible embodiment.

FIG. 10 is an example illustration 1000 in which a 2OS-based sTTI UE B can be allocated the whole bandwidth for sPDSCH, and there are two UL grants for two 2OS-sTTI UEs, such as UE A and UE C, and 1 UL grant for 0.5 ms-sTTI UE D according to a possible embodiment. UE B can also be indicated the rate-matching time index=1 OFDM symbol for 2OS-sTTI UE grants and rate-matching time index=1 OFDM symbol for 0.5 ms-sTTI UE grants. The UL grant for UE D can contain 3 OFDM symbols, basically occupying sTTI indices 3 and 4 from the illustration 200. An 0.5 ms sTTI UE may have a 3 OFDM symbol length in which case, it can span two 2OS-based sTTIs as shown in the illustration 1000. Alternatively, the eNB can completely Frequency Division Multiplex (FDM) 2-OS and 0.5 ms sTTI operations. However, this may or may not be a good way for the example provided in the illustration 700 as in some cases, there may be no way eNB can know UL data presence in advance.

Figure 11:
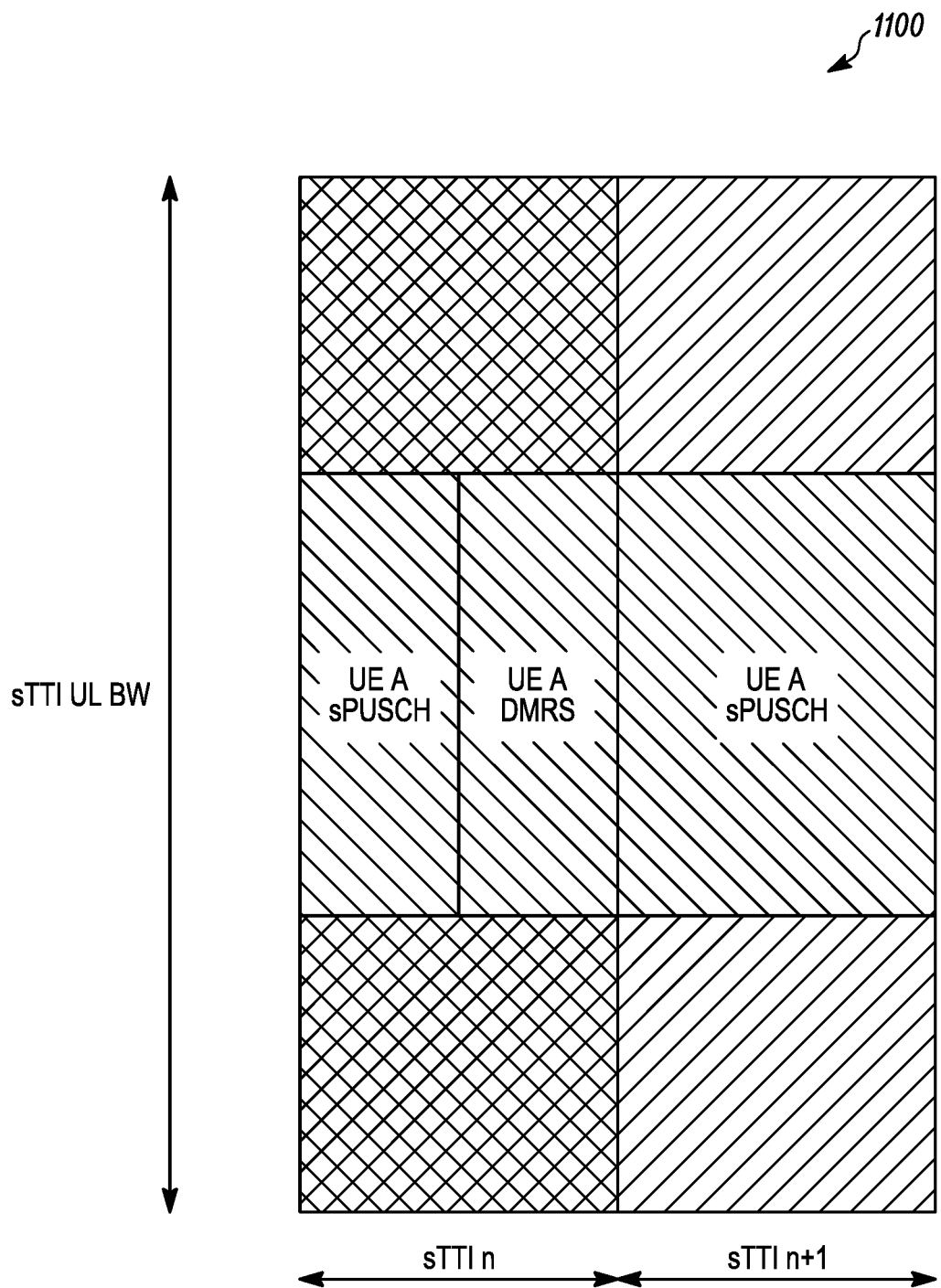
FIG. 11 is an example illustration showing DMRS shared across two consecutive sTTIs for a UE according to a possible embodiment.

FIG. 11 is an example illustration 1100 showing DMRS shared across 2 consecutive sTTIs for a UE, such as UE A, according to a possible embodiment. DMRS allocation in frequency can be similar to those sPUSCH allocations in both sTTIs. For 2-OS sTTI, the UL sTTI pattern for sPUSCH can be down-selected between the following patterns: (2, 2, 3, 2, 2, 3) and (3, 2, 2, 2, 2, 3). Each number can indicate a length of an sTTI in a subframe in number of OFDM symbols. Additionally, the data symbol(s) for a sPUSCH can be confined within a sTTI. Also, if sPUSCH is transmitted, the number of symbols available for data transmission within a sTTI can be 1 or 2 for a sTTI with 2 symbols and 1 or 2 or 3 for a sTTI with 3 symbols. Furthermore, the presence, if any, and the position of the UL DMRS can be given or determined by the UL grant. The UL DMRS can be positioned before or within the associated sTTI. Also, the UL DMRS can be positioned after the associated sTTI. Different schemes can be used for a UE to determine UL DMRS position. For a UE to share a DMRS symbol among two consecutive sTTIs, the sPUSCH allocation in frequency domain in either of the scheduled sTTIs can be the same/similar to that of the DMRS as shown in the illustration 1100.

Figure 12:
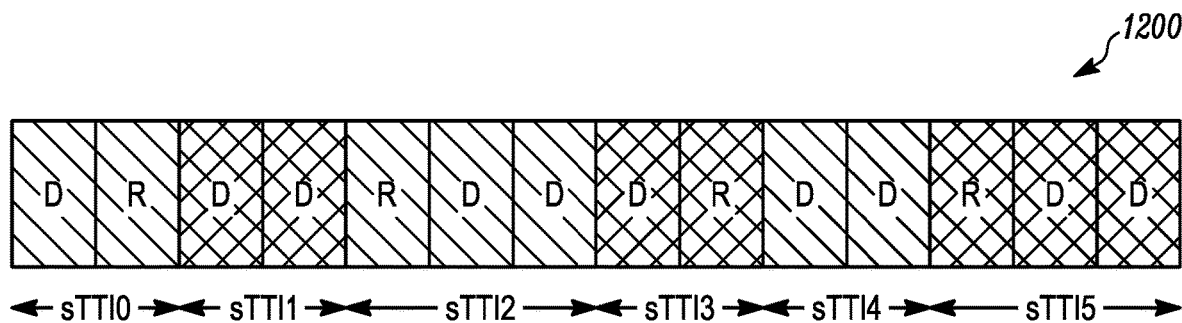
FIG. 12 is an example illustration of a UE transmitting the DMRS and the sPUSCH based on the sTTI index according to a possible embodiment.
Figure 13A:
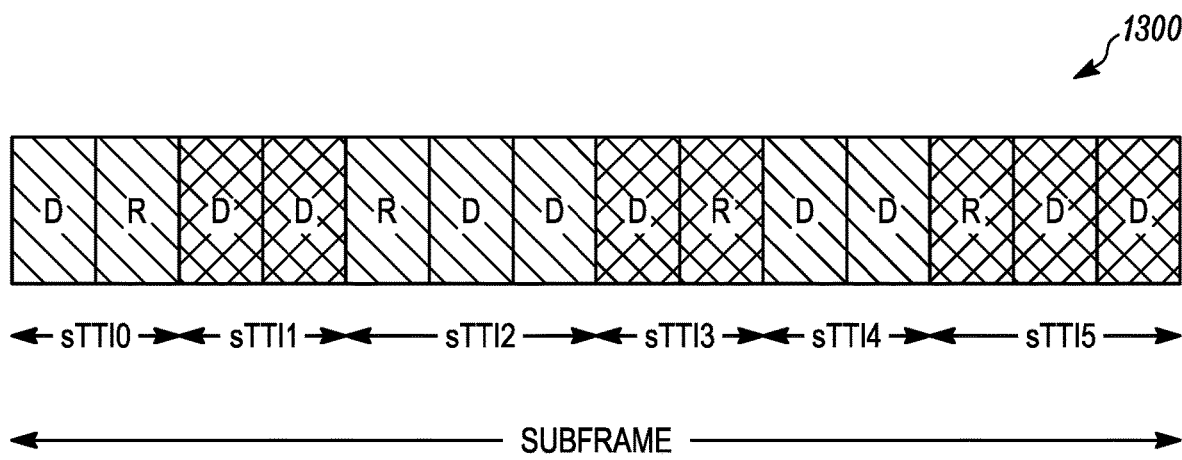
FIGS. 13A and 13B are example illustrations of a UE determining where to send data and DMRS in (a) (2, 2, 3, 2, 2, 3) and (b) (3, 2, 2, 2, 2, 3) UL sTTI layouts based on the scheduled sTTI index according to a possible embodiment.
Figure 13B:
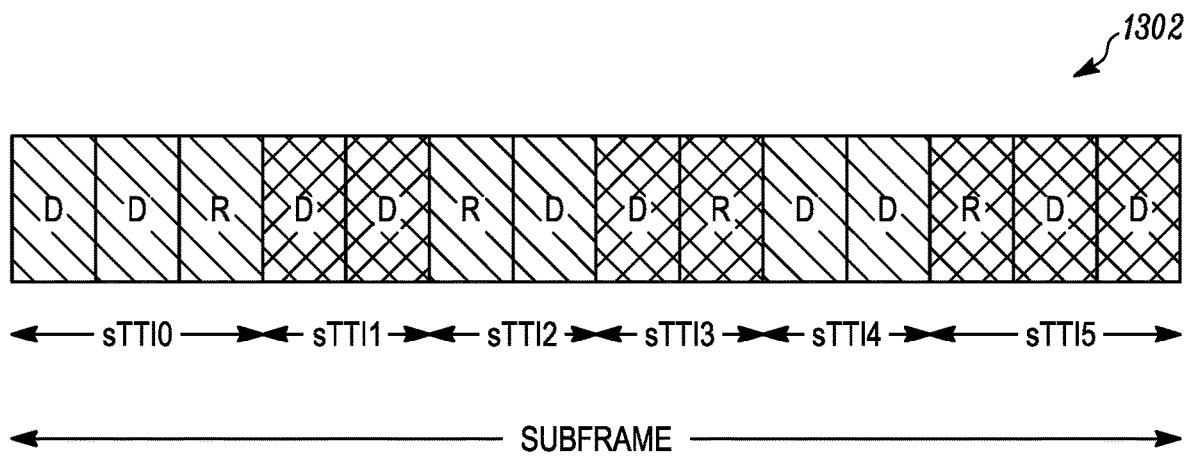

FIG. 12 is an example illustration 1200 of a UE transmitting the DMRS and the sPUSCH based on the sTTI index according to a possible embodiment. FIGS. 13A and 13B are example illustrations 1300 and 1302 of a UE determining where to send data and DMRS in (a) (2, 2, 3, 2, 2, 3) and (b) (3, 2, 2, 2, 2, 3) UL sTTI layouts based on the scheduled sTTI index according to a possible embodiment. "D" can represent sPUSCH and "R" can represent DMRS. The UE can determine the UL DMRS position based on the sTTI index inside a subframe. The illustration 1200 shows the UL sTTI pattern composed of sTTIs of 2, 2, 3, 2, 2, and 3 OFDM symbols, represented as (2, 2, 3, 2, 2, 3). If a UE is scheduled for UL sPUSCH transmission in an sTTI in the UL sTTI layout (2, 2, 3, 2, 2, 3), based on the sTTI index, the UE can transmit the DMRS and the sPUSCH. For instance, if the UE is scheduled for transmission in sTTI0, it can send sPUSCH in the first symbol of sTTI0 and the associated DMRS in the second symbol of the sTTI0; whereas if the UE is scheduled for sPUSCH transmission in sTTI1, the UE can transmit DMRS in the last symbol of the previous sTTI, such as in the last symbol of sTTI0, and can transmit sPUSCH in both symbols of sTTI1.

These patterns can provide for no inter-subframe scheduling dependency. If sTTI0 is scheduled in subframe n, it can contain a DMRS and may not need to use a DMRS in the previous subframe n−1, which can provide more flexibility in scheduling PUSCH and sPUSCH across different subframes. For instance, most RBs in subframe n−1 may have been used by PUSCH of another UE, whereas no PUSCH may have been scheduled in subframe n for any UE. So, an sTTI UE can flexibly be assigned any RBs in sTTI0 of the current subframe for UL transmission.

These patterns can also provide for no inter-slot scheduling dependency. If sTTI3 is scheduled it can contain a DMRS and does not need to use a DMRS in the previous slot, which can provide more flexibility in scheduling 0.5 ms sPUSCH UEs and 2OS-based sPUSCH UEs across different slots of a subframe. For instance, most RBs in the first slot may have been used by 0.5 ms-sPUSCH of another UE, whereas no 0.5 ms-sPUSCH might have been scheduled in the second slot for any UE. Thus, a 2OS-based sTTI UE can flexibly be assigned any RBs in sTTI3 for UL transmission.

These patterns can additionally provide for no DMRS after sTTI. For an sTTI, DMRS can always be before or within the sTTI, not after the sTTI, which may reduce the latency. These patterns can further provide for minimal UL grant overhead. No bits in the UL grant may be needed to indicate which symbols should be used for DMRS and sPUSCH.

The reference symbols that have been shared across 2 sTTIs can be Frequency Division Multiplexed (FDMed) between the two sTTIs. Optionally, signaling can be used to modify the pattern for each individual sTTI position. For example, for sTTI0: DR, RD. If there is no succeeding sTTI, it may be better to use RD pattern for improving latency. For sTTI1: DD, RD. If there is no preceding sTTI, RD can be used, otherwise DD can be used. It also can be possible to always do RDD via pilot FDM sharing. For sTTI2: RDD, DDD.

According to another possible embodiment, an index to the UL DMRS position can be indicated by sPDCCH in each sTTI. The UE can determine the UL DMRS position based on the indicated index and based on at least the UL sTTI pattern and/or the sTTI index inside a subframe.

According to a possible implementation, an eNB can also indicate, such as in slow-DCI or fast DCI, and/or configure, via a higher layer, such as RRC or MAC-CE, a parameter indicating the average number of reference symbols per subframe for the sTTI, such as 2OS sTTI, operation. Then, the UE can determine the UL DMRS position based on the parameter, such as for the farthest reference symbol outside an sTTI to be used for that sTTI, based on the indicated index, and based on one or more of the UL sTTI pattern and the sTTI index inside a subframe. The parameter can be selected based on the temporal variation of the channel. For instance, if the channel does not vary quickly, the parameter can be set to a large value, such as 2 or 4, otherwise a smaller value, such as 1, can be suitable. The parameter can also be fixed in the specifications, such as to 1.

Figure 14:
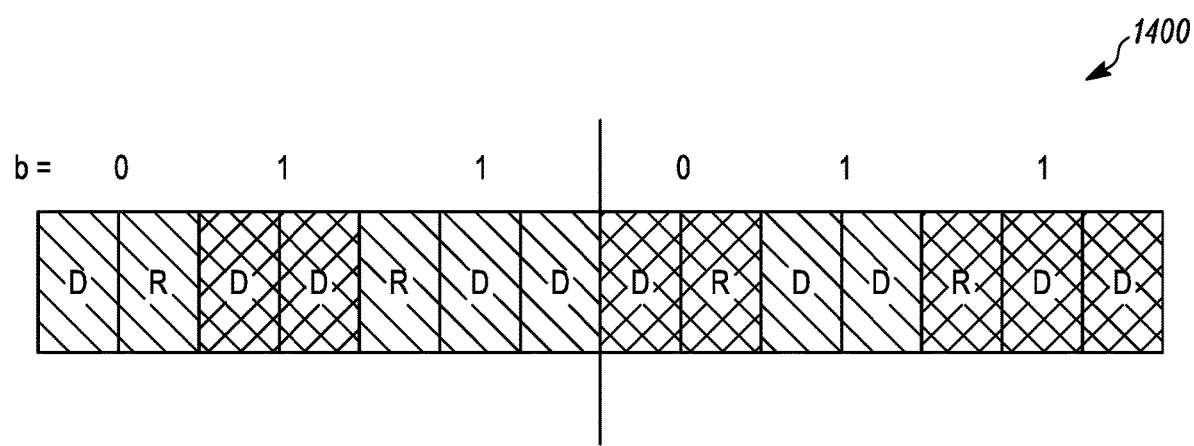
FIG. 14 is an example illustration of different UL grant indication for UL DMRS and the UE interpretation for UL sTTI pattern: (2, 2, 3, 2, 2, 3) according to a possible embodiment.
Figure 15:
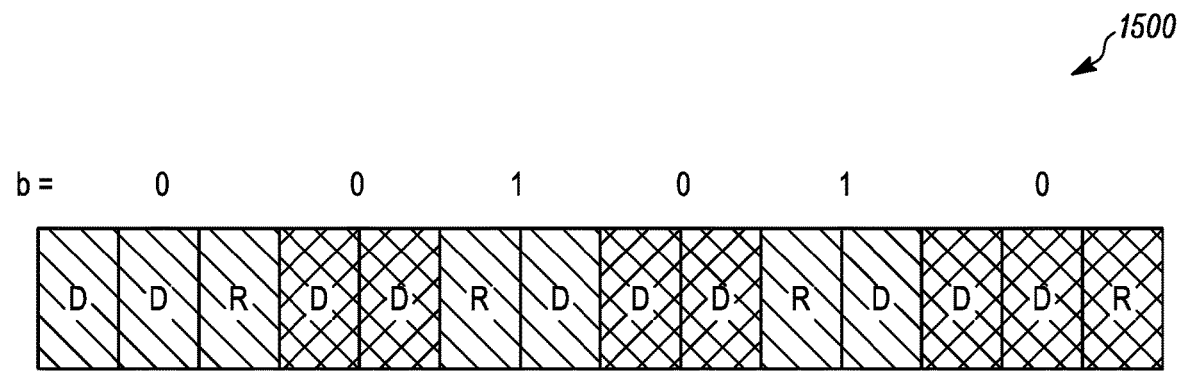
FIG. 15 is an example illustration of different UL grant indication for UL DMRS and the UE interpretation for UL sTTI pattern: (3, 2, 2, 2, 2, 3) according to a possible embodiment.

FIG. 14 is an example illustration 1400 of different UL grant indication for UL DMRS and the UE interpretation for UL sTTI pattern: (2, 2, 3, 2, 2, 3) according to a possible embodiment. FIG. 15 is an example illustration 1500 of different UL grant indication for UL DMRS and the UE interpretation for UL sTTI pattern: (3, 2, 2, 2, 2, 3) according to a possible embodiment. According to a possible implementation, the UL grant can contain 1 bit, referred here to as "b," to indicate the UL DMRS position. For instance, a UE can determine the UL DMRS position according to the following mapping Table 3. Here the farthest reference symbol outside an sTTI to be used for the sTTI parameter can be set to 1. For example, refer to the "R's" in the illustrations 1200 and 1300.

TABLE 3

UL DMRS (shown by "R") and data position ("shown by "D") based on the UL grant and sTTI index for UL sTTI pattern: (2, 2, 3, 2, 2, 3)

| | sTTI Index | | | | | |
|---|---|---|---|---|---|---|
| | 0 | 1 | 2 | 3 | 4 | 5 |
| b = 0 | D, R | D, R | D, D, R | D, R | D, R | D, D, R |
| b = 1 | D, D | D, D | R, D, D | D, D | D, D | R, D, D |
| | (R in symbol 13 of previous subframe) | (R in symbol 1) | | | (R in symbol 6) | (R in symbol 8) |

TABLE 4

UL DMRS (shown by "R") and data position ("shown by "D") based on the UL grant and sTTI index for UL sTTI pattern: (3, 2, 2, 2, 2, 3)

| | sTTI Index | | | | | |
|---|---|---|---|---|---|---|
| | 0 | 1 | 2 | 3 | 4 | 5 |
| b = 0 | D, D, R | D, D (R in symbol 2) | D, D (R in symbol 3) | D, D | D, R | D, D, R |
| b = 1 | D, D (R in symbol 13 of previous subframe) | D, D (R in symbol 1) | R, D | D, D (R in symbol 6) | R, D | R, D, D |

Allowing various distributions of sPUSCH and DMRS in time domain, such as via higher layer signaling, is possible and can provide more flexibility. For instance, one bit in an UL grant can indicate two possibilities shown for each sTTI as shown in Table 5 and Table 6, for (2, 2, 3, 2, 2, 3), and (3, 2, 2, 2, 2, 3) UL sTTI layouts, respectively. Note that these patterns also respect inter-subframe/inter-slot scheduling independency and no DMRS may be used for a scheduled sTTI after that sTTI.

TABLE 5

UL DMRS (shown by "R") and sPUSCH ("shown by "D") position determined based on 1-bit UL grant field "b" and sTTI index for UL sTTI pattern: (2, 2, 3, 2, 2, 3)

| | sTTI Index | | | | | |
|---|---|---|---|---|---|---|
| | 0 | 1 | 2 | 3 | 4 | 5 |
| b = 0 | R, D | R, D | R, D, D | R, D | R, D | R, D, D |
| b = 1 | D, R | D, D (R in symbol 1) | D, D, D (R in symbol 2) | D, R | D, D (R in symbol 8) | D, D, D (R in symbol 9) |

TABLE 6

UL DMRS (shown by "R") and sPUSCH ("shown by "D") position determined based on 1-bit UL grant field "b" and sTTI index for UL sTTI pattern: (3, 2, 2, 2, 2, 3)

| | sTTI Index | | | | | |
|---|---|---|---|---|---|---|
| | 0 | 1 | 2 | 3 | 4 | 5 |
| b = 0 | R, D, D | R, D | R, D | R, D | R, D | R, D, D |
| b = 1 | D, D, R | D, D (R in symbol 2) | D, D (R in symbol 3) | D, R | D, D (R in symbol 8) | D, D, D (R in symbol 9) |

Given the simplicity of the structures shown in the illustration 200 not needing indication/configuration of sPUSCH and DMRS distribution in time domain, the structures can be used as baseline. According to a possible implementation, for individually scheduled UL sTTIs, the UE can determine where to send UL DMRS and sPUSCH based on the scheduled sTTI index. For example, for (2, 2, 3, 2, 2, 3), a (DRDDRDD, DRDDRDD) pattern can be used. For (3, 2, 2, 2, 2, 3), a (DDRDDRD, DRDDRDD) pattern can be used. No time-domain indication of UL DMRS may be the baseline for analysis.

For sPDCCH monitoring, aggregation Levels (ALs) of sPDCCH monitoring candidates can be sTTI BW dependent. In small BW, only small ALs may be allowed. Also, for the first sTTIs of a subframe, such as sTTIs of the first slot, sPDCCH monitoring sets may not be determined via the slow-DCI, such as to avoid 1st-level DCI decoding delay. The first sTTIs of the subframe may have smaller number of sPDCCH monitoring candidates, such as to accommodate PDCCH blind decodes. Slow-DCI can modify the sPDCCH monitoring sets for the rest of the sTTIs.

Regarding the number of Blind Decodes, (BDs) based on the agreed DL sTTI patterns, there can be 6 sTTIs in a subframe. Noting that not all of the sPDCCH BDs need to be processed at the same time, as they occur in different sTTIs; it can be feasible to support additional BDs per subframe than what is usually assumed for LTE, which can be similar to doubling of BDs per subframe supported for LAA initial partial subframes. For example, assuming 44 PDCCH BDs, such as in the first two OFDM symbols of a subframe, can be processed by the end of the first slot in the subframe, the hardware can be reused for up to 44 BDs for sPDCCH decoding in second slot of the subframe. However, to accommodate blind decoding for the sPDCCH decoding candidates belonging to the sTTIs of the first slot, the number of PDCCH BD attempts can be reduced from 44 to, for example, 32, which can allow for 12 BD attempts for the first three sTTIs of a subframe. Assuming two DCI formats to be monitored, that can leave each one of the sTTIs in the first slot with two sPDCCH decoding candidates.

Thus, assuming PDCCH blind decoding is completed by the end of 1st slot of each subframe for 44 BDs, it can be feasible for a UE to perform more than 44 BDs per subframe, such as 32 BDs for PDCCH and 56 BDs for sPDCCH candidates. Also, to balance UE BDs for PDCCH and sPDCCH, sTTIs in the first slot of a subframe can have fewer BDs, such as 4 BDs/sTTI, compared to sTTIs in the second slot of the subframe, such as 14 BDs/sTTI. If a UE is configured with DL 2OS-based sTTI, the number of PDCCH BDs can be reduced and sTTIs in the first slot can have fewer sPDCCH monitoring candidates.

For Aggregation Levels (ALs) of sPDCCH, assuming 36 REs/CCE similar to PDCCH, in a sTTI containing two OFDM symbols without any reference symbol overhead, such as 24 RE/RB, AL 8 can require 12 RBs, such as more than 20% overhead in 50 RB system. Therefore, no higher AL than 8 may be supported for 2OS-sTTI. Thus, assuming a CCE size of 36 REs for sPDCCH, ALs not higher than 8 can be supported for 2OS-based sTTIs.

Based on the above analysis of number of BDs, assuming 2 DCI formats to be monitored, in each sTTI, 2-7 sPDCCH candidates can be monitored. Candidates with different aggregation levels can be monitored in a subframe so that every UE, if configured for sTTI operation, can enjoy the benefits of latency reduction to some extent. Table 7 shows an example of possible aggregation levels for a sTTI as a function of number of sPDCCH candidates monitored in the sTTI. Note that higher ALs, such as 4 and 8, may not be monitored in all sTTIs of a subframe. For instance, every odd sTTI can have a candidate with AL=4, and every even sTTI can have a candidate with AL=8. This way more candidates with lower ALs, such as 1 and 2, can be monitored in an sTTI.

TABLE 7

An example of possible aggregation levels for a sTTI as a function of number of sPDCCH candidates monitored in the sTTI. Candidates with higher ALs 4 and 8 may not be monitored in all sTTIs leaving room for monitoring more candidates with ALs 1 and 2.

| Number of sPDCCH candidates in sTTI | AL distribution (a, b, c, d) for (AL = 1, AL = 2, AL = 4, AL = 8) |
|---|---|
| 2 | (1, 0, 1, 0) in odd sTTIs and (0, 1, 0, 1) in even sTTIs |
| 4 | (1, 1, 1, 1) |
| 6 | (2, 2, 1, 1) |
| 7 | (2, 2, 2, 1) |

Thus, in a subframe, all supported aggregation levels can be monitored and different sTTIs of a subframe may support different set of aggregation levels. Certain sTTIs can allow a single Transmission Mode™ to allow for more aggregation levels.

Figure 16:
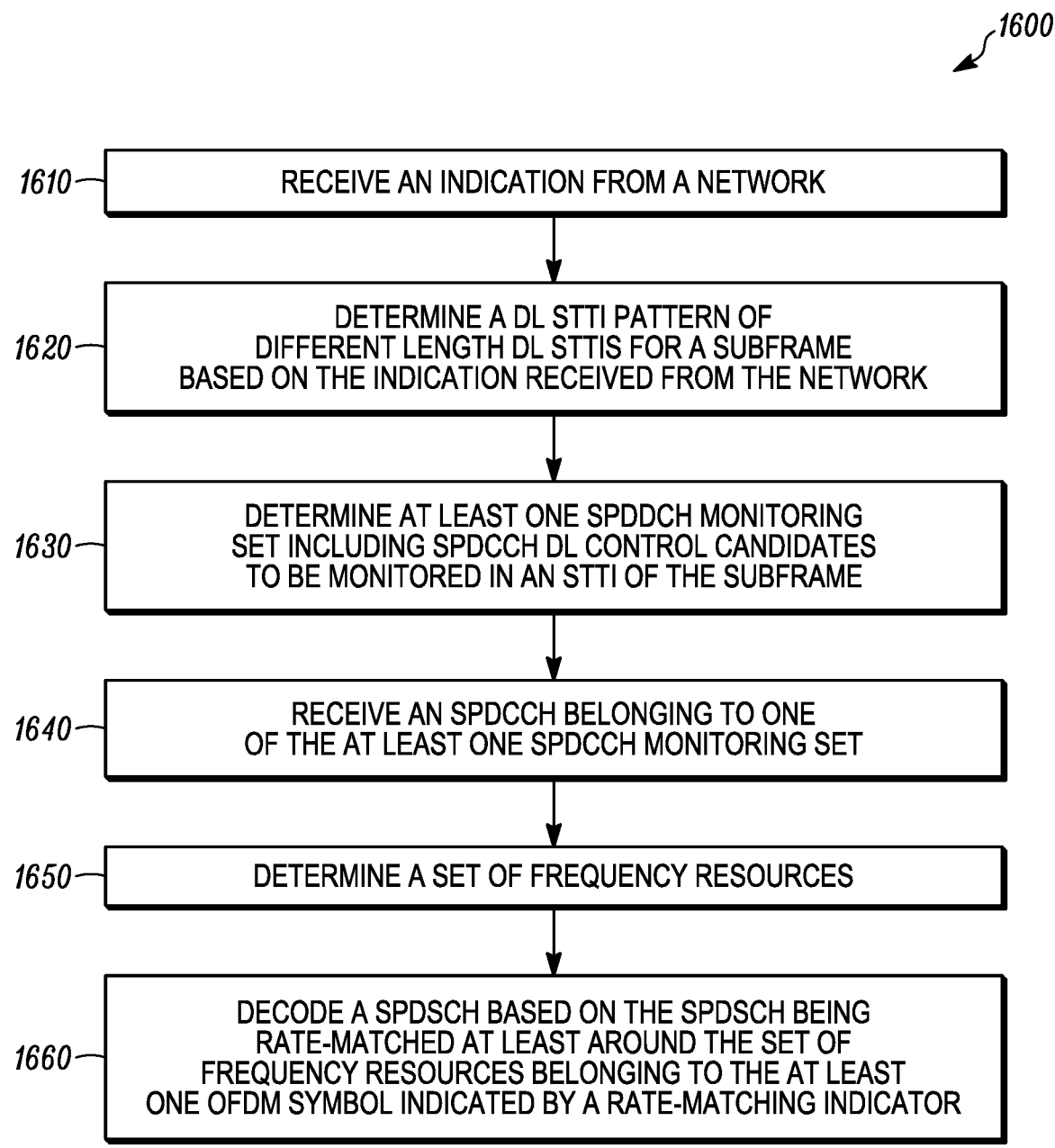
FIG. 16 is an example flowchart illustrating the operation of a wireless communication device according to a possible embodiment.

FIG. 16 is an example flowchart 1600 illustrating the operation of a wireless communication device, such as the UE 110, according to a possible embodiment. At 1610, an indication can be received from a network. The indication can be sent, such as from a base station, in a control channel in at least the first symbol of the subframe. For example, the indication can be sent in a PDCCH, a group common control channel, or other control channel in the first symbols of the subframe.

At 1620, a DL sTTI pattern of different length DL sTTIs for a subframe can be determined based on the indication received from the network. A DL sTTI pattern can represent how sTTIs with different symbol lengths are distributed within a subframe. For example, a sTTI pattern can designate different lengths of different consecutive sTTIs within the subframe. Different sTTI patterns can indicate different lengths for at least one sTTI with a given index in the subframe from another sTTI with a different index in the subframe.

At 1630, at least one sPDCCH monitoring set can be determined. A regular PDCCH can correspond to a subframe length TTI and a sPDCCH can correspond to a sTTI. Also, a sPDCCH can be shorter than a regular PDCCH, either in length or in frequency bandwidth. The at least one sPDCCH monitoring set can be determined from higher layer signaling or otherwise determined. For example, the at least one sPDCCH monitoring set can be determined from higher layer signaling for a first number of sTTIs within the subframe, and/or from an indication for a remaining number of sTTIs within the subframe not including the first number of sTTIs. The first number of sTTIs can be the first sTTIs of the subframe. The at least one sPDCCH monitoring set can include sPDCCH DL control candidates to be monitored by the device in a sTTI of the subframe. An sTTI can be shorter in length than a subframe length TTI. Different sTTIs can have different numbers of sPDCCH control candidates to monitor. A sPDCCH can be a DL control channel signaling DL assignment or UL grant messages allocating time-frequency resources for sPDSCH/sPUSCH and corresponding reception/transmission configurations for the allocated resources. The time-frequency resources for sPDSCH/sPUSCH can include OFDM symbol(s) that is a subset of the OFDM symbols in a subframe. In one example, the OFDM symbol(s) of sPDSCH/sPUSCH can be within a sTTI. According to a possible implementation, a determination can be made as to a number (L) of OFDM symbols for DL control (sPDCCH) candidates to be monitored by the device in a sTTI of the subframe.

At 1640, an sPDCCH belonging to one of the at least one sPDCCH monitoring set can be received from a network. The sPDCCH can schedule DL data packet transmissions in a sPDSCH. Data packet transmissions are different from control transmissions. The sPDCCH can also indicate a rate-matching indicator (i1) that can indicate at least one OFDM symbol. The rate-matching indicator can indicate one or a set of symbols in a sTTI, such as the location and number of at least one symbol in the sTTI. There can be multiple rate-matching indicators, multiple numbers of sPDCCH monitoring sets, multiple sets of frequency resources, and multiple indications. The sPDCCH belonging to one of the at least one sPDCCH monitoring set received from the network can span the number (L) of OFDM symbols. The number (L) can be determined at least based on a higher layer configuration. The higher layer configuration can indicate one of the following options:
1. L=1 for all sTTIs of the subframe;
2. L=2 for all sTTIs of the subframe; and
3. L=1 for a first number of sTTIs of the subframe and L=2 for the second number of sTTIs of the subframe.

If the higher layer indicates option 3, the device can determine (L) for a sTTI of the subframe, based on the sTTI index and the number of configured Common Reference Signal (CRS) ports.

At 1650, a set of frequency resources (f1) can be determined. The set of frequency resources (f1) can be determined at least based on the rate-matching indicator (i1). The set of frequency resources (f1) can also be determined at least based on control information in the sPDCCH. The set of frequency resources (f1) can further be determined based on the at least one sPDCCH monitoring set. The set of frequency resources (f1) can belong to a search space configured by higher layer signaling.

At 1660, the sPDSCH can be decoded based on the sPDSCH being rate-matched at least around the set of frequency resources (f1) belonging to the at least one OFDM symbol indicated by the rate-matching indicator (i1). The set of frequency resources (f1) belonging to the at least one OFDM symbol indicated by the rate-matching indicator (i1) indicates REs can be declared as reserved for sPDSCH. The UE can assume that DL data for the UE is mapped to REs of the allocated RBs and OFDM symbols corresponding to the UE's DL resource allocation that are at least not declared as reserved for sPDSCH. A resource allocation can indicate which RBs and OFDM symbols are used for sPDSCH. Rate matching can distinguish between REs used for DL data for a given device, such as a UE, within a DL resource allocation and REs used for other purposes or reserved, such as control signaling that can be used for other devices, such as at least one other UEs.

According to a possible implementation, the rate-matching indicator can be a first rate-matching indicator (i1). The at least one OFDM symbol can be a first at least one OFDM symbol. The set of frequency resources (f1) can be a first set of frequency resources (f1). The sPDCCH can further indicate a second rate-matching indicator (i2) that indicates a second at least one OFDM symbol. A second set of frequency resources (f2) can be determined. The second set of frequency resources (f2) can be determined at least based on control information in the sPDCCH. The second set of frequency resources (f2) can further be determined based on a configured set of resource blocks. The configured set of resource blocks, such as search spaces, can be used by other devices to monitor their own sPDCCH decoding candidates. The configured set of resource blocks may contain only sPDCCH candidates scheduling UL data on a sPUSCH. The configured set of resource blocks can be used by the device to receive an UL grant. The number OFDM symbol(s) indicated by the second rate-matching indicator (i2) can be greater than the least one OFDM symbol(s) indicated by the first rate-matching indicator (i1). The sPDSCH can be decoded based on the sPDSCH being rate-matched at least around the first set of frequency resources (f1) belonging to the first at least one OFDM symbol indicated by the first rate-matching indicator (i1) and the second set of frequency resources (f2) belonging to the second at least one OFDM symbol indicated by the second rate-matching indicator (i2). Thus, the REs corresponding to the union of the first set of frequency resources (f1) belonging to the first at least one OFDM symbol indicated by the first rate-matching indicator (i1) and the second set of frequency resources (f2) belonging to the second at least one OFDM symbol indicated by the second rate-matching indicator (i2) can be considered/declared as reserved for sPDSCH. The UE can assume that DL data for the UE is mapped to REs of the allocated RBs and OFDM symbols corresponding to the UE's DL resource allocation that are at least not declared as reserved for sPDSCH. Thus, sPDSCH is not mapped to the REs corresponding to the union.

Figure 17:
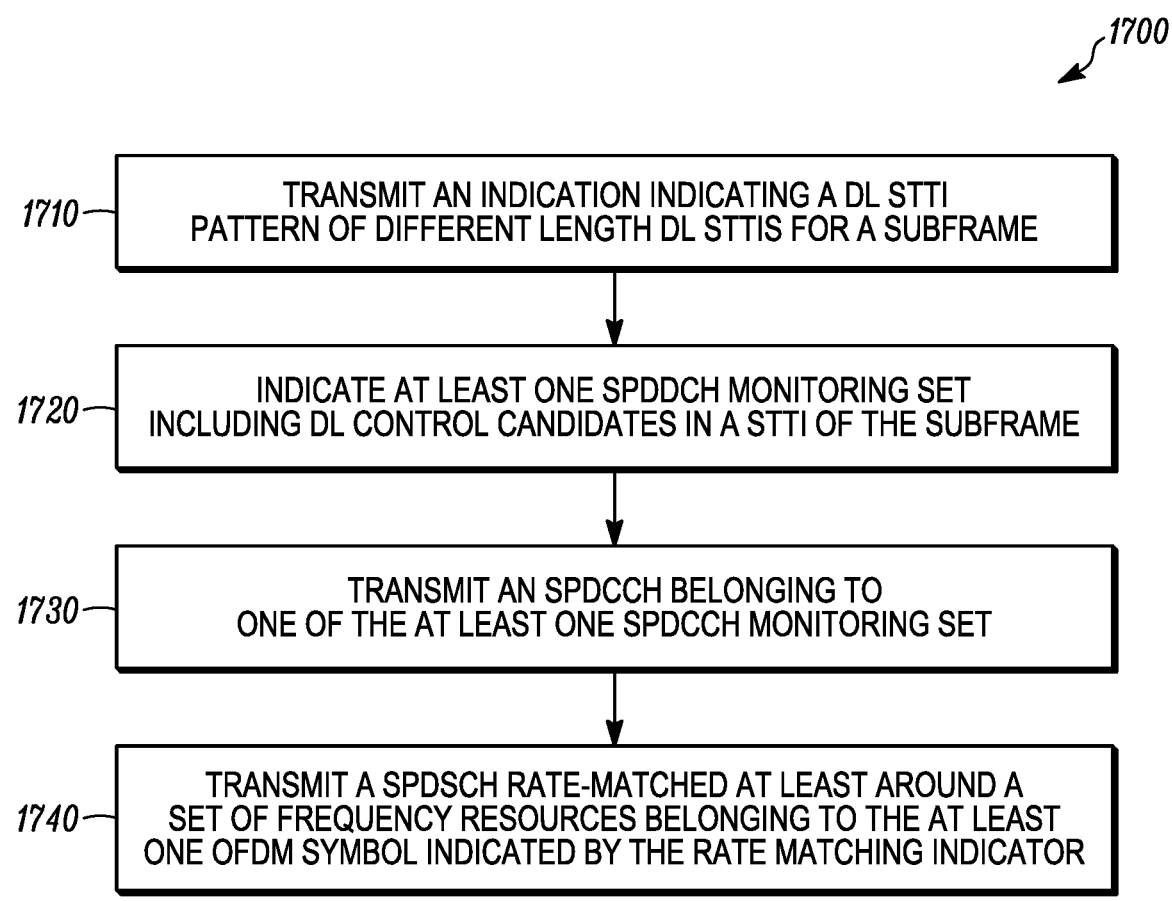
FIG. 17 is an example flowchart illustrating the operation of a wireless communication device according to a possible embodiment.

FIG. 17 is an example flowchart 1700 illustrating the operation of a wireless communication device, such as a network entity like the base station 120, according to a possible embodiment. At 1710, an indication can be transmitted to a device from a network. The indication can indicate a DL sTTI pattern of different length DL sTTIs for a subframe. An sTTI can be shorter in length than a subframe length TTI.

At 1720, at least one sPDCCH monitoring set can be indicated to a device. The at least one sPDCCH monitoring set can be indicated, such as transmitted or otherwise indicated, to a UE. Higher layer signaling can indicate the at least one sPDCCH monitoring set. For example, higher layer signaling for a first number of sTTIs within the subframe, and/or an indication for a remaining number of sTTIs within the subframe not including the first number of sTTIs can indicate the at least one sPDCCH monitoring set. As a further example, the indication can be sent in a control channel in at least the first symbol of the subframe. The at least one sPDCCH monitoring set can include sPDCCH DL control candidates to be monitored by the device in a sTTI of the subframe.

At 1730, an sPDCCH belonging to one of the at least one sPDCCH monitoring set can be transmitted. The sPDCCH can schedule DL data packet transmissions in a sPDSCH. The sPDCCH can also indicate a rate-matching indicator (i1) that indicates at least one OFDM symbol.

At 1740, a sPDSCH rate-matched at least around a set of frequency resources (f1) belonging to the at least one OFDM symbol indicated by the rate-matching indicator (i1) can be transmitted. The set of frequency resources (f1) can be determined at least based on the rate-matching indicator (i1). At least control information in the sPDCCH can indicate the set of frequency resources (f1). At least the at least one sPDCCH monitoring set can indicate the set of frequency resources (f1).

According to a possible implementation, the rate-matching indicator can be a first rate-matching indicator (i1). The at least one OFDM symbol can be a first at least one OFDM symbol. The set of frequency resources (f1) can be a first set of frequency resources (f1). The sPDCCH can further indicate a second rate-matching indicator (i2) that indicates a second at least one OFDM symbol. A second set of frequency resources (f2) can be indicated. For example, the second set of frequency resources (f2) can be indicated to a UE. At least control information in the sPDCCH can indicate the second set of frequency resources (f2). Also, at least a configured set of resource blocks can indicate the second set of frequency resources (f2). The configured set of resource blocks may contain only sPDCCH candidates scheduling UL data on a sPUSCH. The sPDSCH can be transmitted, where the sPDSCH can be rate-matched at least around the first set of frequency resources (f1) belonging to the first at least one OFDM symbol indicated by the first rate-matching indicator (i1) and the second set of frequency resources (f2) belonging to the second at least one OFDM symbol indicated by the second rate-matching indicator (i2).

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

According to another possible embodiment, an indication from a network can be received at a device. A DL sTTI pattern can be determined for a subframe based on an indication received from the network. A sTTI can be shorter in length than a subframe length TTI. A DL sTTI pattern can represent how sTTIs with different symbol lengths are distributed within a subframe. An index of the sTTI can indicate the location of a sTTI in the DL sTTI pattern. For example, a sTTI pattern can designate different lengths of different consecutive sTTIs within the subframe. Different sTTI patterns can indicate different lengths for at least one sTTI with a given index in the subframe. A number of OFDM symbols for sPDCCH candidates to be monitored by the device in a sTTI of the subframe can be determined at least based on the DL sTTI pattern and an index of the sTTI inside the subframe. A subframe can include a PDCCH and an sPDCCH. The sPDCCH can correspond to a sTTI and the PDCCH can correspond to a subframe length TTI. sPDCCH candidates can occupy one or two symbols in all sTTIs of a subframe. For example, some sTTIs of a subframe can include sPDCCH candidates that occupy one symbol and other sTTIs of the subframe can include sPDCCH candidates that occupy two symbols. sPDCCH candidates can be monitored and decoded according to the determined number of OFDM symbols. The subframe can includes CRSs and the sPDCCH candidates can be decoded based on the CRSs. According to a possible implementation, an indication can be received that indicates the symbols in sTTIs in the subframe that are occupied by the sPDCCH. For example, the indication can indicate whether the sPDCCH occupies 1 symbol for all sTTIs of a subframe, 2 symbols for all sTTIs of a subframe, or 1 symbol for some sTTIs and 2 symbols for other sTTIs of a subframe.

According to another possible embodiment, a first indication and a second indication can be received in a control channel at a device. The second indication can be a 1-bit indication. The first indication and the second indication can be received in a control channel in an UL grant sent in a DL sTTI. The first indication can indicate resources for UL data transmission in a UL sTTI in an UL subframe. The second indication can indicate a pattern for UL data symbols and UL DMRS symbols in the UL subframe. The subframe can includes a pattern of UL sTTIs of at least two different lengths. Each UL sTTI can have the UL sTTI index in the pattern of UL sTTIs in the subframe. The second indication can indicate a pattern for UL data and UL DMRS symbols in the pattern of UL sTTIs in the UL subframe. The UL DMRS position can be determined at least based on the second indication and an UL sTTI index in the UL subframe. According to a possible implementation, a parameter can be received from a network. The parameter can indicate the location of a UL DMRS symbol, with respect to a scheduled UL sTTI, to be utilized for demodulation of the UL data in the scheduled UL sTTI. The parameter can indicate a farthest possible UL DMRS symbol with respect to a scheduled UL sTTI to be utilized for demodulation of the UL data in the scheduled UL sTTI. The UL DMRS position can be determined at least based on the parameter, the second indication, and the UL sTTI index in the UL subframe. The UL sTTI index can indicate the location of the UL sTTI in the UL subframe. There can be at least two possible indexes including DMRS position index and sTTI index. The UL DMRS and the UL data can be transmitted based on the determined UL DMRS position.

Figure 18:
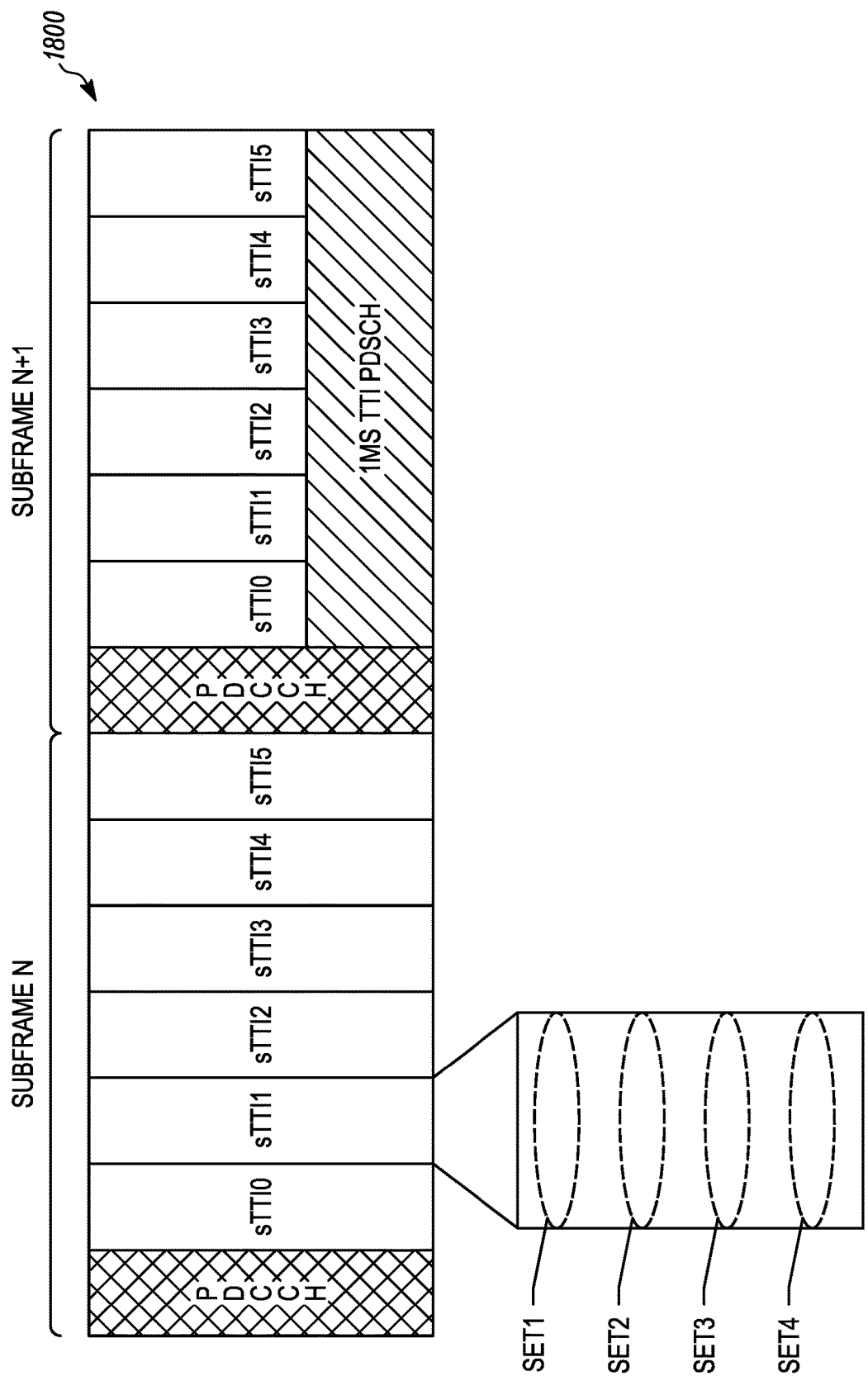
FIG. 18 is an example illustration of multiple-PRB set configuration for sPDCCH monitoring according to a possible embodiment.

FIG. 18 is an example illustration 1800 of multiple-PRB set configuration for sPDCCH monitoring according to a possible embodiment. Having multiple PRB-sets for a UE to monitor sPDCCH can enable the eNB to readily multiplex non-sTTI and sTTI UEs in the same subframe by transmitting an sPDCCH scheduling the sTTI UE on a PRB-set that is not overlapped with the non-sTTI transmission, hence reducing the sPDCCH blocking rate. Similar to the current EPDCCH design, for each serving cell, higher layer signaling can configure a UE with multiple PRB-sets for sPDCCH monitoring. The PRBs corresponding to each PRB-set can be configured by higher layers. In each sTTI of a subframe where the UE is enabled for sTTI operation, the UE can monitor some or all of the configured PRB-sets.

For the example shown the illustration 1800, an eNB can configure 4 PRB-sets for sPDCCH control monitoring. Subframe n+1 can have a legacy PDSCH allocation overlapping some sPDCCH monitoring sets, such as 3 and 4, however, the eNB can use the remaining sets, such as 1 and 2, to schedule sPDSCH in that subframe. Thus, a UE can be configured to monitor sPDCCH candidates over multiple sets of RBs using similar principle as EPDCCH-PRB-set configuration.

Figure 19:
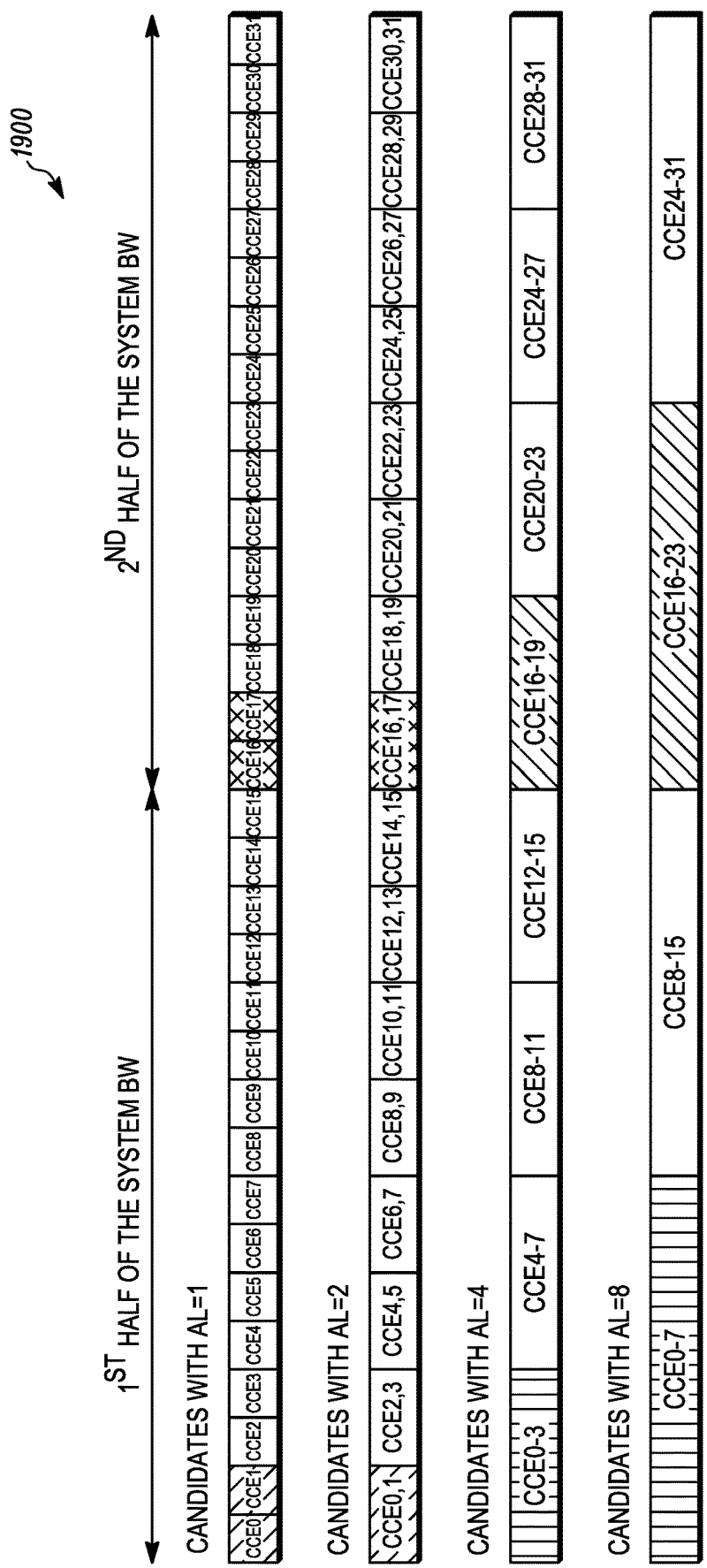
FIG. 19 is an example illustration of sPDCCH decoding candidates belonging to different PRB-sets according to a possible embodiment.

FIG. 19 is an example illustration 1900 of sPDCCH decoding candidates belonging to different PRB-sets according to a possible embodiment. Assuming 7 sPDCCH candidates per sTTI, a UE can monitor either of the sets (1, 2, 3) or (4, 2, 3). CCEs of the first two sets can be mapped within the first half of the system BW, and CCEs of the second two sets can be mapped within the second half of the system BW.

Different PRB-sets for sPDCCH monitoring can have different bandwidth, different number of decoding candidates, and can support different aggregation levels. For instance, as shown in the illustration 1900, sets 1 and 4 from the illustration 1800 can include two decoding candidates with AL=1, and one decoding candidate with AL=2 taking about 3 RBs assuming 36 REs/CCE; whereas sets 2 and 3 can have one candidate with AL=4 and one candidate with AL=8 taking about 12 RBs. Assuming 7 sPDCCH candidates per sTTI, a UE can monitor either of the sets (1, 2, 3) or (4, 2, 3). The eNB can signal which sets to monitor at the beginning of the subframe, such as based on the knowledge of the resources to be given to non-sTTI operation. Note that in this example, the UE may always monitor configured sPDCCH-PRB-sets 2 and 3 in all sTTIs even if the UE misses the signal indicating which sets to monitor. Thus, a UE may monitor a subset of configured sPDCCH RBs in sTTIs of a subframe. Also, at the beginning of a subframe, an eNB can indicate which subsets to monitor. A default subset may always be monitored even if the UE misses the subset monitoring indication.

The sets can be pruned if the UE can monitor less than 7 candidates in every sTTI or in some sTTIs of a subframe, such as the sTTIs in the first slot. For instance, to monitor 4 candidates per sTTI, sets 1 and 4 can be pruned to have only 1 candidate with AL=1 or the candidate with AL=8 can be taken out of set 2 while the candidate with AL=4 can be taken out of set 3.

If monitoring of only 2 sPDCCH candidates supported per sTTI, such as for the sTTIs of the first slot, sets 1 and 4 can contain only a single candidate with AL=2, and set 2 may include only one candidate with AL=4 in some of the sTTIs while set 3 can be empty and in the remaining sTTIs, set 3 can include only one candidate with AL=4 while set 2 is empty.

In the above example, in every sTTI where 7 sPDCCH candidates are monitored, each of ALs=1, 4, and 8 can have 2 candidates and AL=2 can have one candidate. To have 2 candidates with AL=1, 2, and 4, and only 1 candidate for AL=8 as shown in Table 7, set 1 and 4 each can contain an additional AL=2 candidate, such as spanning CCEs 2-3 for set 1 and CCE18-19 for set 4, respectively. In odd sTTIs, set 2 may have no AL=8 candidate, and in even sTTIs, set 3 may have no AL=8 candidate.

According to another possible implementation, assuming 7 sPDCCH candidates per sTTI, a UE can monitor either of the sets (1, 2, 3) or (4, 2, 3) based on signaling at the beginning of a subframe or based on sTTI index.

Figure 20:
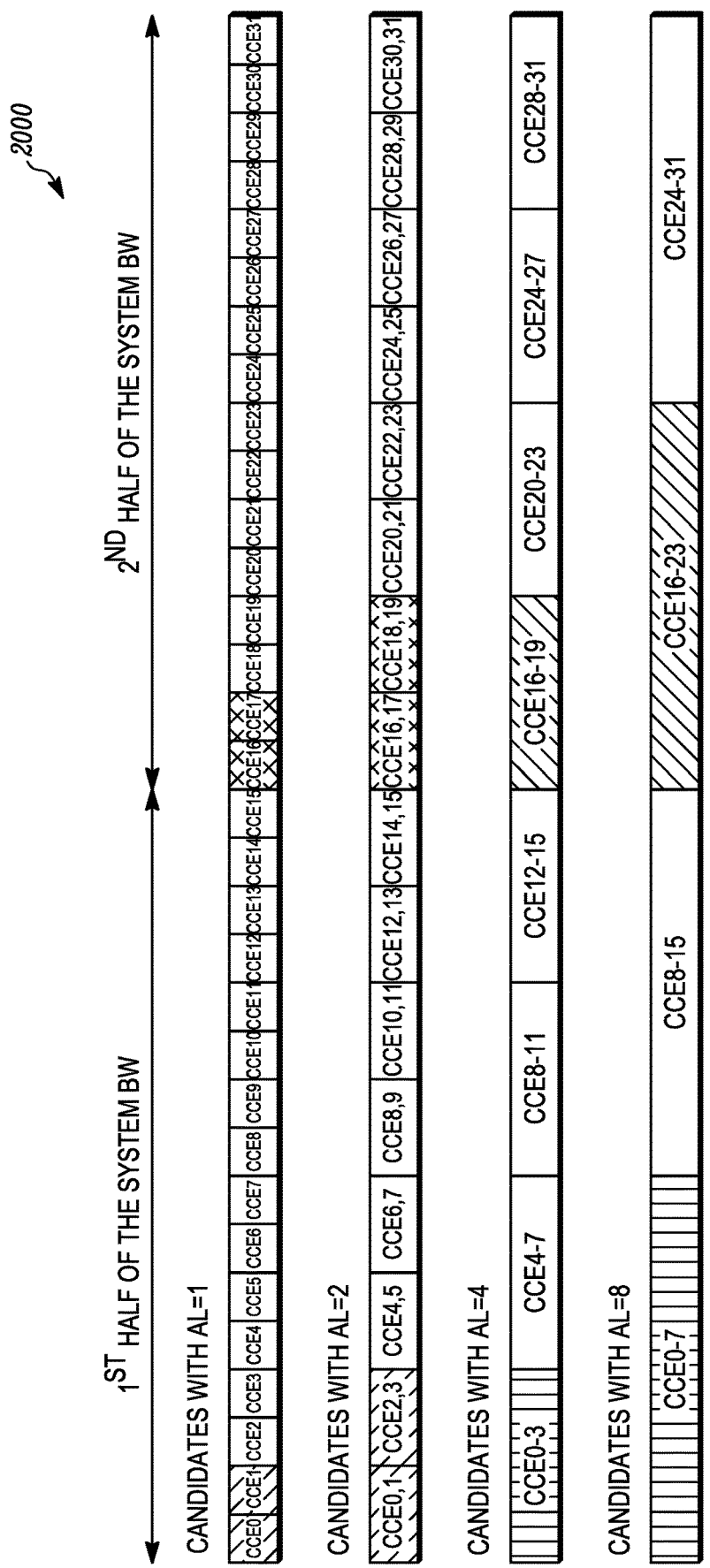
FIG. 20 is an example illustration of sPDCCH monitoring for a UE according to another possible embodiment.

FIG. 20 is an example illustration 2000 of sPDCCH monitoring for a UE according to another possible embodiment. Assuming 6 sPDCCH candidates per sTTI, in odd sTTIs, a UE can monitor sets (1,2) or (3,2) based on a signaling at the beginning of a subframe and in even sTTIs, a UE can monitor sets (1,4) or (3,4) based on a signaling at the beginning of a subframe.

Figure 21:
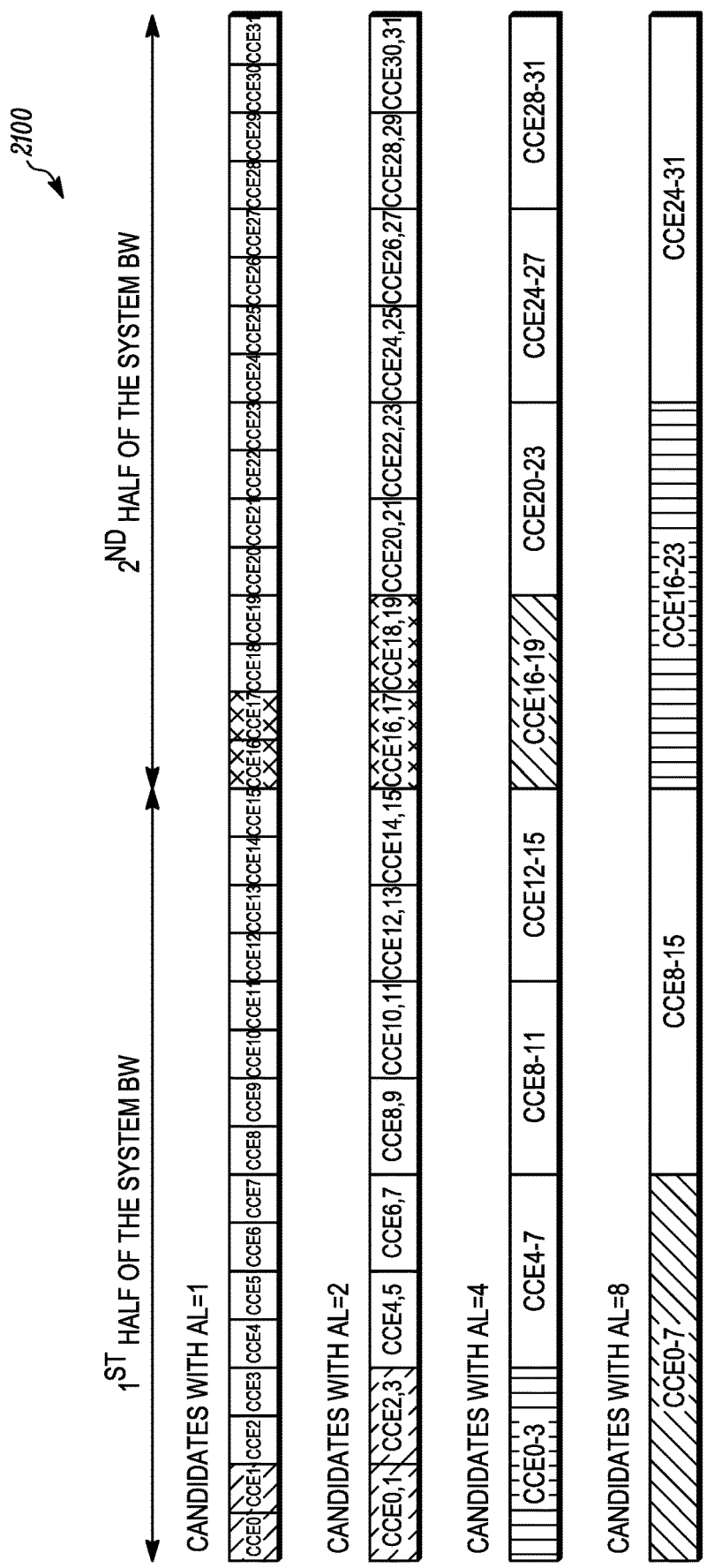
FIG. 21 is an example illustration of sPDCCH decoding candidates belonging to different PRB-sets according to another possible embodiment.

FIG. 21 is an example illustration 2100 of sPDCCH decoding candidates belonging to different PRB-sets according to another possible embodiment. Set 3 can include some of the decoding candidates belonging to sets 1 and 2. Set 6 can include some of the decoding candidates belonging to sets 4 and 5. CCEs of the first three sets can be mapped within the first half of the system BW, and CCEs of the second three sets can be mapped within the second half of the system BW.

sPDCCH search space design can be categorized into one or combination of the following schemes. In one scheme, in each sTTI, quantize the control region that can be known to all UEs, and signal which part is available. In another scheme, in each sTTI, quantize the system (or sTTI) bandwidth and signal which part is available. In another scheme, in each sTTI, arrange UL and DL sPDCCH candidates such that a UE by finding its own DL grant can figure out which resources in its DL allocation is usable for sPDSCH. In another scheme, in each sTTI, signal unused sPDCCH-PRB sets amongst the configured sPDCCH-PRB-sets to be monitored by a UE. Each of the above schemes may come with their own limitations, such as with respect to control candidate placements or with somehow coarse quantization granularity to avoid putting many bits in a DL grant in a 2OS-based DL sTTI where control overhead should be managed.

The same issue of unused control resource utilization can occur in the context of EPDCCH. There, the allocated PDSCH for a UE can be only rate-matched around its own EPDCCH. Thus, depending on the resource allocation and sPDCCH configuration, a similar approach may perform nearly as good as other proposals without additional limitations and specification efforts. Although, there are some differences between EPDCCH and sPDCCH scenarios. One difference can be up to 4 eCCEs can fit into a PRB, while a CCE, assuming 36 REs/CCE, for sPDCCH can takes more than 1 RB, assuming 2 symbols and 12 subcarriers per symbol, in an sTTI composed of 2 OFDM symbols. Another difference can be where resource allocation granularity can be different, such as larger RBG sizes may be used for sPDSCH. Another difference can be sPDCCH length in number of symbols can be smaller than the number of symbols in the sTTI. Another difference can be 2OS-based sTTI UE can be multiplexed with 0.5 ms-sTTI UE.

A UE can be configured to monitor sPDCCH decoding candidates in an sTTI. The monitoring candidates can belong to multiple sPDCCH-PRB sets. The eNB can configure a UE with multiple sPDCCH-PRB sets. Then the eNB, such as at the beginning of a subframe, can indicate which sPDCCH decoding sets amongst the ones that the UE is configured with should be monitored in the subframe. The eNB, in each sTTI, can indicate which of the configured sets are unused for which UE may be able to use to receive sPDSCH in that sTTI. For instance, the eNB can configure a UE with 4 sets, where each set can contain sPDCCH candidates spanning different CCEs (for sTTI a control channel element (CCE) is called sCCE). For instance, set 1 can contain 3 sPDCCH decoding candidates: 1 candidate with AL=2 spanning CCE0-1 and 2 candidates with AL=1 (CCE0, CCE1). In each sTTI of a subframe, the eNB can indicate which one of the monitoring sets is not used for control, such as sPDCCH, available for sPDSCH reuse. For example, with 2 bits the eNB can indicate which one of the 4 configured sets is not used for control, such as shown in Table 8.

TABLE 8

| sPDCCH bits in each sTTI | Meaning |
| --- | --- |
| 0 0 | CCE 0-1 available |
| 0 1 | CCE0-7 available |
| 1 0 | CCE16-17 |
| 1 1 | CCE16-23 available |

If the sets overlap in CCEs, the meaning of available resources can be based on the overlap as shown in Table 9.

TABLE 9

| sPDCCH bits in each sTTI | Meaning |
| --- | --- |
| 0 0 | CCE 0-1 available |
| 0 1 | CCE2-7 available |
| 1 0 | CCE16-17 |
| 1 1 | CCE18-23 available |

The UE can take out the resources, such as CCEs, where it has decoded its sPDCCH in the sTTI.

Based on the refinement of the sPDCCH region in slow-DCI or based on the sPDCCH-sets to be monitored signaled in slow-DCI, the rate-matching bits can be interpreted in each sTTI block in case the control region is distributed in the VRB domain. The information regarding the unused sPDCCH region in a sTTI of a subframe, signaled via a fast DCI in the sTTI, can be interpreted by the UE based on the set of sPDCCH-PRB-sets to be monitored in the sTTI. For example, the set of sPDCCH-PRB-sets to be monitored in the sTTI can be determined via a slow-DCI signaled at the beginning of the subframe.

For DMRS-based sPDCCH, localized transmission may be good. In this case, the spots allocated in the figures above may not be good for some UEs in a frequency selective channel Thus, having multiple locations can be useful. If those locations are put at each sTTI block, also for scheduling a UE for multiple sTTI blocks, more bits may have to be sent, such as a certain number of bits per each scheduled sTTIs, so different number of bits present in the sDCI.

To schedule multiple ULs, at least MAC-CE, such as based on recently active low-latency UEs, can be used to modify the UL candidates because the eNB may not know if a UE detected the slow-DCI. If the interpretation is performed based on the slow-DCI, in case the UE has not detected the slow-DCI, there could be one of following different UE behaviors. In one behavior, a UE can assume all of the possible UL candidates are used. In another behavior, the UE can assume none of the possible UL candidates are used. In another behavior, the UE can assume a default set of the possible UL candidates are used.

Figure 22:
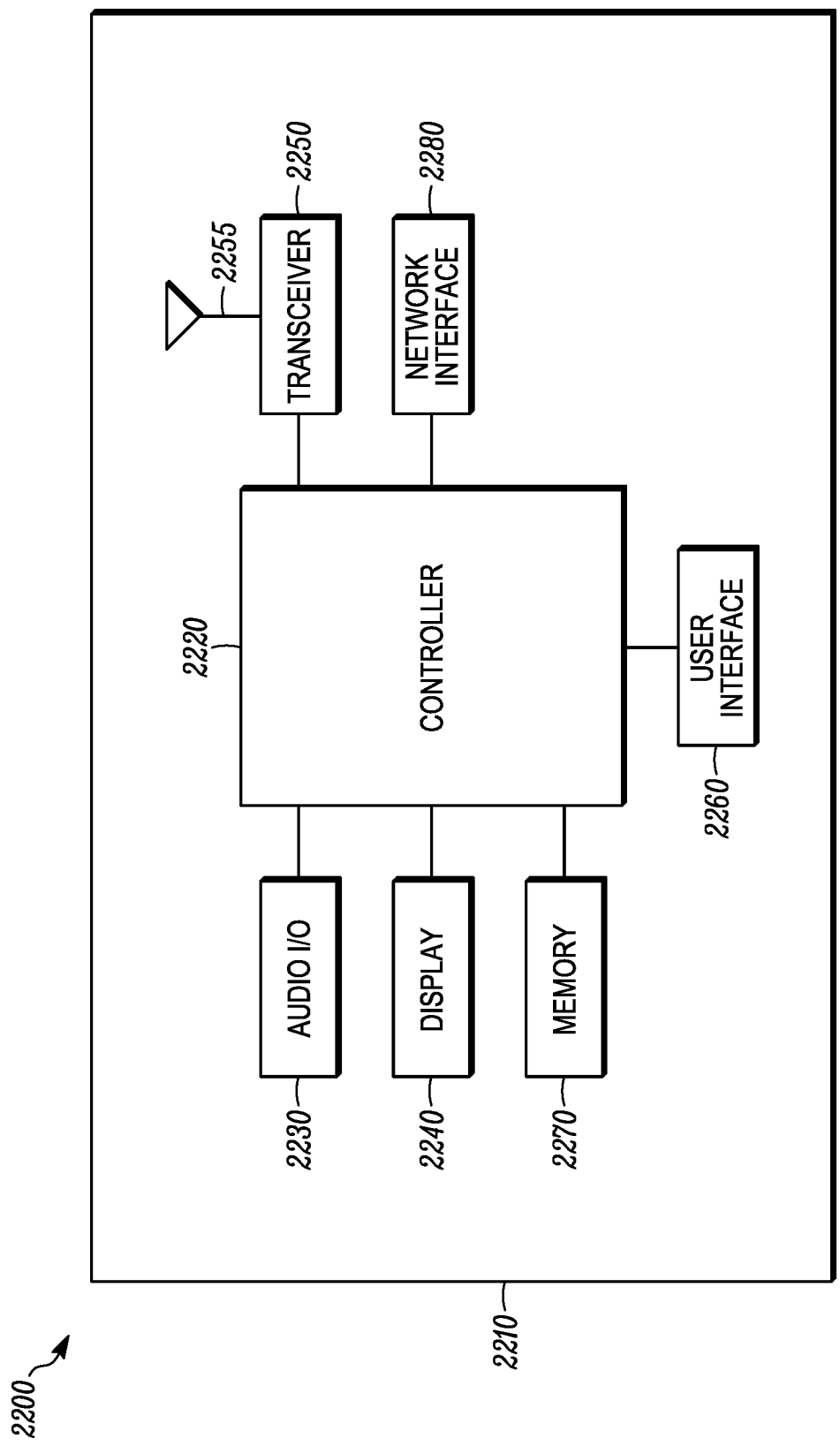
FIG. 22 is an example block diagram of an apparatus according to a possible embodiment.

FIG. 22 is an example block diagram of an apparatus 2200, such as the UE 110, the base station 120, or any other wireless communication device disclosed herein, according to a possible embodiment. The apparatus 2200 can include a housing 2210, a controller 2220 coupled to the housing 2210, audio input and output circuitry 2230 coupled to the controller 2220, a display 2240 coupled to the controller 2220, a transceiver 2250 coupled to the controller 2220, an antenna 2255 coupled to the transceiver 2250, a user interface 2260 coupled to the controller 2220, a memory 2270 coupled to the controller 2220, and a network interface 2280 coupled to the controller 2220. The apparatus 2200 may not necessarily include all of the illustrated elements for different embodiments of the present disclosure. The apparatus 2200 can perform the methods described in all the embodiments.

The display 2240 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 2250 can include a transmitter and/or a receiver. The audio input and output circuitry 2230 can include a microphone, a speaker, a transducer, or any other audio input and output circuitry. The user interface 2260 can include a keypad, a keyboard, buttons, a touch pad, a joystick, a touch screen display, another additional display, or any other device useful for providing an interface between a user and an electronic device. The network interface 2280 can be a Universal Serial Bus (USB) port, an Ethernet port, an infrared transmitter/receiver, an IEEE 1394 port, a WLAN transceiver, or any other interface that can connect an apparatus to a network, device, and/or computer and that can transmit and receive data communication signals. The memory 2270 can include a random-access memory, a read only memory, an optical memory, a solid state memory, a flash memory, a removable memory, a hard drive, a cache, or any other memory that can be coupled to an apparatus.

The apparatus 2200 or the controller 2220 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 2270 or elsewhere on the apparatus 2200. The apparatus 2200 or the controller 2220 may also use hardware to implement disclosed operations. For example, the controller 2220 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 2220 may be any controller or processor device or devices capable of operating an apparatus and implementing the disclosed embodiments. Some or all of the additional elements of the apparatus 2200 can also perform some or all of the operations of the disclosed embodiments.

In operation, the transceiver 2250 can receive an indication from a network. The controller 2220 can determine a DL sTTI pattern of different length DL sTTIs for a subframe based on the indication received from the network. The controller 2220 can determine at least one sPDCCH monitoring set including sPDCCH DL control candidates to be monitored by the apparatus 2200 in a sTTI of the subframe. A sTTI can be shorter in length than a subframe length TTI. The at least one sPDCCH monitoring set can be determined from higher layer signaling. The at least one sPDCCH monitoring set can also be determined from higher layer signaling for a first number of sTTIs within the subframe and/or from an indication for a remaining number of sTTIs within the subframe not including the first number of sTTIs. The transceiver 2250 can receive, from the network, an sPDCCH belonging to one of the at least one sPDCCH monitoring set. The sPDCCH can schedule DL data packet transmissions in a sPDSCH. The sPDCCH can also indicate a rate-matching indicator (i1) that indicates at least one OFDM symbol. The controller 2220 can determine a set of frequency resources (f1). The set of frequency resources (f1) can be determined at least based on the rate-matching indicator (i1). The set of frequency resources (f1) can also be determined at least based on control information in the sPDCCH. The controller 2220 can decode the sPDSCH based on the sPDSCH being rate-matched at least around the set of frequency resources (f1) belonging to the at least one OFDM symbol indicated by the rate-matching indicator (i1).

According to a possible implementation, the rate-matching indicator can be a first rate-matching indicator (i1). The at least one OFDM symbol can be a first at least one OFDM symbol. The set of frequency resources (f1) can be a first set of frequency resources (f1). The sPDCCH can further indicate a second rate-matching indicator (i2) that indicates a second at least one OFDM symbol. The controller 2220 can determine a second set of frequency resources (f2). The second set of frequency resources (f2) can be determined at least based on control information in the sPDCCH. The controller 2220 can decode the sPDSCH based on the sPDSCH being rate-matched at least around the first set of frequency resources (f1) belonging to the first at least one OFDM symbol indicated by the first rate-matching indicator (i1), and the second set of frequency resources (f2) belonging to the second at least one OFDM symbol indicated by the second rate-matching indicator (i2).

According to another possible embodiment, the apparatus 2200 can operate as a network entity, such as the base station 120. The transceiver 2250 can indicate at least one sPDCCH monitoring set including sPDCCH DL control candidates to be monitored by a device in a sTTI of the subframe. For example, the at least one sPDCCH monitoring set can be indicated to a UE. The transceiver 2250 can transmit, to the device, an sPDCCH belonging to one of the at least one sPDCCH monitoring set. The sPDCCH can schedule DL data packet transmissions in a sPDSCH. The sPDCCH can also indicate a rate-matching indicator (i1) that can indicate at least one OFDM symbol. The transceiver 2250 can transmit a sPDSCH rate-matched at least around a set of frequency resources (f1) belonging to the at least one OFDM symbol indicated by the rate-matching indicator (i1). The controller 2220 can determine and/or generate the information transmitted by the transceiver. According to this embodiment, the apparatus 2200 can also perform additional operations, such as those described in the flowchart 1700 and described in other embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   determining at least one shortened physical downlink control channel monitoring set including shortened physical downlink control channel downlink control candidates to be monitored by the device in a shortened transmit time interval of a subframe,
   where the shortened transmit time interval is shorter in length than a subframe length transmit time interval, and
   where the at least one shortened physical downlink control channel monitoring set spans a set of orthogonal frequency division multiplexing symbols;
   receiving, by the device from a network, a shortened physical downlink control channel belonging to one of the at least one shortened physical downlink control channel monitoring set,
   where the shortened physical downlink control channel corresponds at least to downlink transmission in the shortened transmit time interval,
   where the shortened physical downlink control channel schedules downlink data packet transmissions in a shortened physical downlink shared channel within the shortened transmit time interval, and
   where the shortened physical downlink control channel also indicates an indicator that indicates at least one orthogonal frequency division multiplexing symbol within the shortened transmit time interval,
   where the at least one orthogonal frequency division multiplexing symbol does not belong to the set of orthogonal frequency division multiplexing symbols;
   determining a set of frequency resources; and
   decoding the downlink data packet transmission in the shortened physical downlink shared channel based on the set of frequency resources being not available for the shortened physical downlink shared channel,
   wherein the set of frequency resources belong to the at least one orthogonal frequency division multiplexing symbol,
   the shortened physical downlink shared channel being rate-matched at least around the set of frequency resources belonging to the at least one orthogonal frequency division multiplexing symbol.

2. The method according to claim 1,
   wherein the set of frequency resources is determined at least based on the indicator.

3. The method according to claim 1,
   wherein the indicator is a first indicator,
   wherein the at least one orthogonal frequency division multiplexing symbol is a first at least one orthogonal frequency division multiplexing symbol,
   wherein the set of frequency resources is a first set of frequency resources,
   wherein the shortened physical downlink control channel further indicates a second indicator that indicates a second at least one orthogonal frequency division multiplexing symbol,
   wherein the method further comprises
   determining a second set of frequency resources,
   wherein decoding comprises decoding the downlink data packet transmissions in the shortened physical downlink shared channel based on the first set of frequency resources belonging to the first at least one orthogonal frequency division multiplexing symbol indicated by the first indicator being not available for the shortened physical downlink shared channel, and
   the second set of frequency resources belonging to the second at least one orthogonal frequency division multiplexing symbol indicated by the second indicator being not available for the shortened physical downlink shared channel.

4. The method according to claim 3,
   wherein the second set of frequency resources are determined at least based on control information in the shortened physical downlink control channel.

5. The method according to claim 4,
   wherein the second set of frequency resources are further determined based on a configured set of resource blocks.

6. The method according to claim 1,
   wherein the at least one shortened physical downlink control channel monitoring set is determined from higher layer signaling.

7. The method according to claim 1,
   wherein the indicator comprises a rate-matching indicator that at least indicates that the shortened physical downlink shared channel is not mapped to a subset of resources allocated via the shortened physical downlink control channel for the shortened physical downlink shared channel.

8. The method according to claim 1,
   wherein the at least one shortened physical downlink control channel monitoring set further spans a first set of frequency resources,
   wherein the set of frequency resources comprises a second set of frequency resources,
   wherein determining the second set of frequency resources comprises determining a second set of frequency resources at least based on the first set of frequency resources, and
   wherein decoding comprises decoding the downlink data packet transmissions in the shortened physical downlink shared channel based on the second set of frequency resources belonging to the at least one orthogonal frequency division multiplexing symbol indicated by the indicator being not available for the shortened physical downlink shared channel.

9. The method according to claim 1,
   wherein the set of orthogonal frequency division multiplexing symbols comprises a set of a plurality of orthogonal frequency division multiplexing symbols,
   wherein the set of frequency resources comprises a set of a plurality of frequency resources, and
   wherein decoding the downlink data packet transmissions in the shortened physical downlink shared channel comprises decoding the downlink data packet transmissions in the shortened physical downlink shared channel based on the shortened physical downlink shared channel being rate-matched at least around the set of frequency resources belonging to the at least one orthogonal frequency division multiplexing symbol indicated by the indicator.

10. The method according to claim 1,
    wherein the at least one shortened physical downlink control channel monitoring set comprises a first shortened physical downlink control channel monitoring set that spans a first set of orthogonal frequency division multiplexing symbols, wherein the at least one orthogonal frequency division multiplexing symbol belongs to a second shortened physical downlink control channel monitoring set spanning a second set of orthogonal frequency division multiplexing symbols,
where the first set of orthogonal frequency division multiplexing symbols is a subset of the second set of orthogonal frequency division multiplexing symbols.

11. The method according to claim 10,
wherein the second shortened physical downlink control channel monitoring set contains shortened physical downlink control channel candidates having a different shortened transmit time interval length than the shortened transmit time interval.

12. An apparatus comprising:
a controller that determines at least one shortened physical downlink control channel monitoring set including shortened physical downlink control channel downlink control candidates to be monitored by the apparatus in a shortened transmit time interval of a subframe,
where the shortened transmit time interval is shorter in length than a subframe length transmit time interval, and
where the at least one shortened physical downlink control channel monitoring set spans a set of orthogonal frequency division multiplexing symbols; and
a transceiver coupled to the controller,
where the transceiver receives from a network a shortened physical downlink control channel belonging to one of the at least one shortened physical downlink control channel monitoring set,
where the shortened physical downlink control channel corresponds at least to downlink transmission in the shortened transmit time interval,
where the shortened physical downlink control channel schedules downlink data packet transmissions in a shortened physical downlink shared channel within the shortened transmit time interval, and
where the shortened physical downlink control channel also indicates an indicator that indicates at least one orthogonal frequency division multiplexing symbol within the shortened transmit time interval,
where the at least one orthogonal frequency division multiplexing symbol does not belong to the set of orthogonal frequency division multiplexing symbols,
wherein the controller determines a set of frequency resources, and
wherein the controller decodes the downlink data packet transmissions in the shortened physical downlink shared channel based on the set of frequency resources being not available for the shortened physical downlink shared channel,
wherein the set of frequency resources belong to the at least one orthogonal frequency division multiplexing symbol,
the shortened physical downlink shared channel being rate-matched at least around the set of frequency resources belonging to the at least one orthogonal frequency division multiplexing symbol.

13. The apparatus according to claim 12,
wherein the set of frequency resources is determined at least based on the indicator.

14. The apparatus according to claim 12,
wherein the indicator is a first indicator,
wherein the at least one orthogonal frequency division multiplexing symbol is a first at least one orthogonal frequency division multiplexing symbol,
wherein the set of frequency resources is a first set of frequency resources,
wherein the shortened physical downlink control channel further indicates a second indicator that indicates a second at least one orthogonal frequency division multiplexing symbol,
wherein the controller determines a second set of frequency resources,
wherein the controller decodes the downlink data packet transmissions in the shortened physical downlink shared channel based on the first set of frequency resources belonging to the first at least one orthogonal frequency division multiplexing symbol indicated by the first indicator being not available for the shortened physical downlink shared channel, and
the second set of frequency resources belonging to the second at least one orthogonal frequency division multiplexing symbol indicated by the second indicator being not available for the shortened physical downlink shared channel.

15. The apparatus according to claim 14,
wherein the second set of frequency resources are determined at least based on control information in the shortened physical downlink control channel.

16. The apparatus according to claim 12,
wherein the set of frequency resources are determined at least based on control information in the shortened physical downlink control channel.

17. The apparatus according to claim 12,
wherein the indicator comprises a rate-matching indicator that at least indicates that a subset of resources the shortened physical downlink shared channel is not mapped to is from a set of resources allocated via the shortened physical downlink control channel for the shortened physical downlink shared channel.

18. The apparatus according to claim 12,
wherein the at least one shortened physical downlink control channel monitoring set monitoring set further spans a first set of frequency resources,
wherein the controller determines a set of frequency resources by determining a second set of frequency resources at least based on the first set of frequency resources, and
wherein the controller decodes the downlink data packet transmissions in the shortened physical downlink shared channel based on the second set of frequency resources belonging to the at least one orthogonal frequency division multiplexing symbol indicated by the indicator being not available for the shortened physical downlink shared channel.

19. The apparatus according to claim 12,
wherein the set of orthogonal frequency division multiplexing symbols comprises a set of a plurality of orthogonal frequency division multiplexing symbols,
wherein the set of frequency resources comprises a set of a plurality of frequency resources, and
wherein the controller decodes the downlink data packet transmissions in the shortened physical downlink shared channel based on the shortened physical downlink shared channel being rate-matched at least around the set of frequency resources belonging to the at least one orthogonal frequency division multiplexing symbol indicated by the indicator.

20. The apparatus according to claim 12,
wherein the at least one shortened physical downlink control channel monitoring set comprises a first shortened physical downlink control channel monitoring set that spans a first set of orthogonal frequency division multiplexing symbols,
wherein the at least one orthogonal frequency division multiplexing symbol belongs to a second shortened physical downlink control channel monitoring set spanning a second set of orthogonal frequency division multiplexing symbols, where the first set of orthogonal frequency division multiplexing symbols is a subset of the second set of orthogonal frequency division multiplexing symbols.

21. The apparatus according to claim 20,
wherein the second shortened physical downlink control channel monitoring set contains shortened physical downlink control channel candidates having a different shortened transmit time interval length than the shortened transmit time interval.

\* \* \* \* \*